(12) United States Patent
Negley et al.

(10) Patent No.: US 9,115,870 B2
(45) Date of Patent: Aug. 25, 2015

(54) LED LAMP AND HYBRID REFLECTOR

(71) Applicant: Cree, Inc., Durham, NC (US)

(72) Inventors: Gerald H. Negley, Chapel Hill, NC (US); Matthew Donofrio, Raleigh, NC (US)

(73) Assignee: Cree, Inc., Durham, NC (US)

( * ) Notice: Subject to any disclaimer, the term of this patent is extended or adjusted under 35 U.S.C. 154(b) by 176 days.

(21) Appl. No.: 13/828,516

(22) Filed: Mar. 14, 2013

(65) Prior Publication Data
US 2014/0268808 A1 Sep. 18, 2014

(51) Int. Cl.
| | |
|---|---|
| *F21V 7/00* | (2006.01) |
| *F21V 7/22* | (2006.01) |
| *F21V 3/04* | (2006.01) |
| *F21K 99/00* | (2010.01) |
| *C23C 28/00* | (2006.01) |
| *F21V 19/00* | (2006.01) |
| *F21V 23/00* | (2015.01) |
| *G02B 5/08* | (2006.01) |
| *F21Y 101/02* | (2006.01) |

(Continued)

(52) U.S. Cl.
CPC ... *F21V 7/22* (2013.01); *F21K 9/13* (2013.01); *F21V 3/04* (2013.01); *F21V 3/0472* (2013.01); *C23C 28/00* (2013.01); *F21K 9/1375* (2013.01); *F21V 19/003* (2013.01); *F21V 23/006* (2013.01); *F21V 29/777* (2015.01); *F21Y 2101/02* (2013.01); *F21Y 2111/005* (2013.01); *G02B 5/0816* (2013.01)

(58) Field of Classification Search
CPC ............ F21V 3/04; F21V 7/00; G02B 5/0816
USPC ................... 362/307, 310, 344, 296.02, 341; 427/162
See application file for complete search history.

(56) References Cited

U.S. PATENT DOCUMENTS 3,165,265 A * 1/1965 Clause .......................... 362/344
3,581,162 A 5/1971 Wheatley
(Continued)

FOREIGN PATENT DOCUMENTS

| | | |
|---|---|---|
| EP | 1058221 A2 | 12/2000 |
| EP | 0890059 B1 | 6/2004 |

(Continued)

OTHER PUBLICATIONS

Cree, Inc., Notification of Transmittal of the International Search Report and the Written Opinion of the International Searching Authority, Jun. 5, 2014, International Patent Application No. PCT/US2014/023019.

(Continued)

*Primary Examiner* — Ali Alavi
(74) *Attorney, Agent, or Firm* — Dennis J. Williamson; Moore & Van Allen PLLC

(57) ABSTRACT

A lamp comprises an enclosure having a reflective surface and an exit surface through which light is emitted from the enclosure and a base. A plurality of LEDs are located in the enclosure and are operable to emit light when energized through an electrical path from the base. The reflective surface comprises a first reflective layer applied to the enclosure and a second reflective layer over the first reflective layer. The first reflective layer is a metalized surface. The second layer comprises a transparent carrier such as silicone mixed with a reflective media such as $TiO_2$, Barium Sulfate and/or ZnO or silver.

31 Claims, 19 Drawing Sheets

(51) Int. Cl.
*F21Y 111/00* (2006.01)
*F21V 29/77* (2015.01)

(56) References Cited

U.S. PATENT DOCUMENTS

| | | | |
|---|---|---|---|
| 3,984,590 A | | 10/1976 | Mason et al. |
| 4,081,662 A | * | 3/1978 | Pehrson et al. ............... 714/814 |
| 4,081,667 A | | 3/1978 | Lewin et al. |
| 4,197,480 A | * | 4/1980 | Ryan, Jr. ...................... 313/25 |
| 5,169,229 A | | 12/1992 | Hoppert et al. |
| 5,353,210 A | | 10/1994 | Strok et al. |
| 5,463,280 A | | 10/1995 | Johnson |
| 5,561,346 A | | 10/1996 | Byrne |
| 5,585,783 A | | 12/1996 | Hall |
| 5,655,830 A | | 8/1997 | Ruskouski |
| 5,688,042 A | | 11/1997 | Madadi et al. |
| 5,806,965 A | | 9/1998 | Deese |
| 5,947,588 A | | 9/1999 | Huang |
| 5,949,347 A | | 9/1999 | Wu |
| 6,212,004 B1 | | 4/2001 | Stachowiak et al. |
| 6,220,722 B1 | | 4/2001 | Begemann |
| 6,227,679 B1 | | 5/2001 | Zhang et al. |
| 6,234,648 B1 | | 5/2001 | Borner et al. |
| 6,250,774 B1 | | 6/2001 | Begemann et al. |
| 6,276,822 B1 | | 8/2001 | Bedrosian et al. |
| 6,465,961 B1 | | 10/2002 | Cao |
| 6,523,978 B1 | | 2/2003 | Huang |
| 6,550,953 B1 | | 4/2003 | Ichikawa et al. |
| 6,634,770 B2 | | 10/2003 | Cao |
| 6,659,632 B2 | | 12/2003 | Chen |
| 6,709,132 B2 | | 3/2004 | Ishibashi |
| 6,803,607 B1 | | 10/2004 | Chan et al. |
| 6,848,819 B1 | | 2/2005 | Arndt et al. |
| 6,864,513 B2 | | 3/2005 | Lin et al. |
| 6,948,829 B2 | | 9/2005 | Verdes et al. |
| 6,982,518 B2 | | 1/2006 | Chou et al. |
| 7,048,412 B2 | | 5/2006 | Martin et al. |
| 7,080,924 B2 | | 7/2006 | Tseng et al. |
| 7,086,756 B2 | | 8/2006 | Maxik |
| 7,086,767 B2 | | 8/2006 | Sidwell et al. |
| 7,144,135 B2 | | 12/2006 | Martin et al. |
| 7,165,866 B2 | | 1/2007 | Li |
| 7,172,314 B2 | | 2/2007 | Currie et al. |
| 7,354,174 B1 | | 4/2008 | Yan |
| 7,396,142 B2 | | 7/2008 | Laizure, Jr. et al. |
| 7,600,882 B1 | | 10/2009 | Morejon et al. |
| 7,726,836 B2 | | 6/2010 | Chen |
| 7,824,065 B2 | | 11/2010 | Maxik |
| 8,021,025 B2 | | 9/2011 | Lee |
| 8,253,316 B2 | | 8/2012 | Sun et al. |
| 8,272,762 B2 | | 9/2012 | Maxik et al. |
| 8,274,241 B2 | | 9/2012 | Guest et al. |
| 8,277,082 B2 | | 10/2012 | Dassanayake et al. |
| 8,282,250 B1 | | 10/2012 | Dassanayake et al. |
| 8,292,468 B2 | | 10/2012 | Narendran et al. |
| 8,322,896 B2 | | 12/2012 | Falicoff et al. |
| 8,371,722 B2 | | 2/2013 | Carroll |
| 8,400,051 B2 | | 3/2013 | Hakata et al. |
| 8,415,865 B2 | | 4/2013 | Liang et al. |
| 8,421,320 B2 | | 4/2013 | Chuang |
| 8,421,321 B2 | | 4/2013 | Chuang |
| 8,421,322 B2 | | 4/2013 | Carroll et al. |
| 8,449,154 B2 | | 5/2013 | Uemoto et al. |
| 8,502,468 B2 | | 8/2013 | Li et al. |
| 8,641,237 B2 | | 2/2014 | Chuang |
| 8,653,723 B2 | | 2/2014 | Cao et al. |
| 8,696,168 B2 | | 4/2014 | Li et al. |
| 8,740,415 B2 | | 6/2014 | Wheelock |
| 8,750,671 B1 | | 6/2014 | Kelly et al. |
| 8,752,984 B2 | | 6/2014 | Lenk et al. |
| 8,760,042 B2 | | 6/2014 | Sakai et al. |
| 2004/0201990 A1 | | 10/2004 | Meyer |
| 2005/0275960 A1 | | 12/2005 | Wu et al. |
| 2007/0002569 A1 | | 1/2007 | Ulmer et al. |
| 2007/0002923 A1 | | 1/2007 | Mehrtens et al. |
| 2009/0184618 A1 | | 7/2009 | Hakata et al. |
| 2012/0040585 A1 | | 2/2012 | Huang |

FOREIGN PATENT DOCUMENTS

| | | |
|---|---|---|
| EP | 2551929 A1 | 1/2013 |
| GB | 2345954 A | 7/2000 |
| JP | H09265807 A | 10/1997 |
| JP | 2000173304 A | 6/2000 |
| JP | 2001118403 A | 4/2001 |
| JP | 2001266624 A | 9/2001 |
| WO | 0124583 A1 | 4/2001 |
| WO | 0160119 A2 | 8/2001 |
| WO | 2012011279 A1 | 1/2012 |
| WO | 2012031533 A1 | 3/2012 |

OTHER PUBLICATIONS

Dupont, DuPont Ti-Pure titanium dioxide, Titanium Dioxide for Coatings.

* cited by examiner

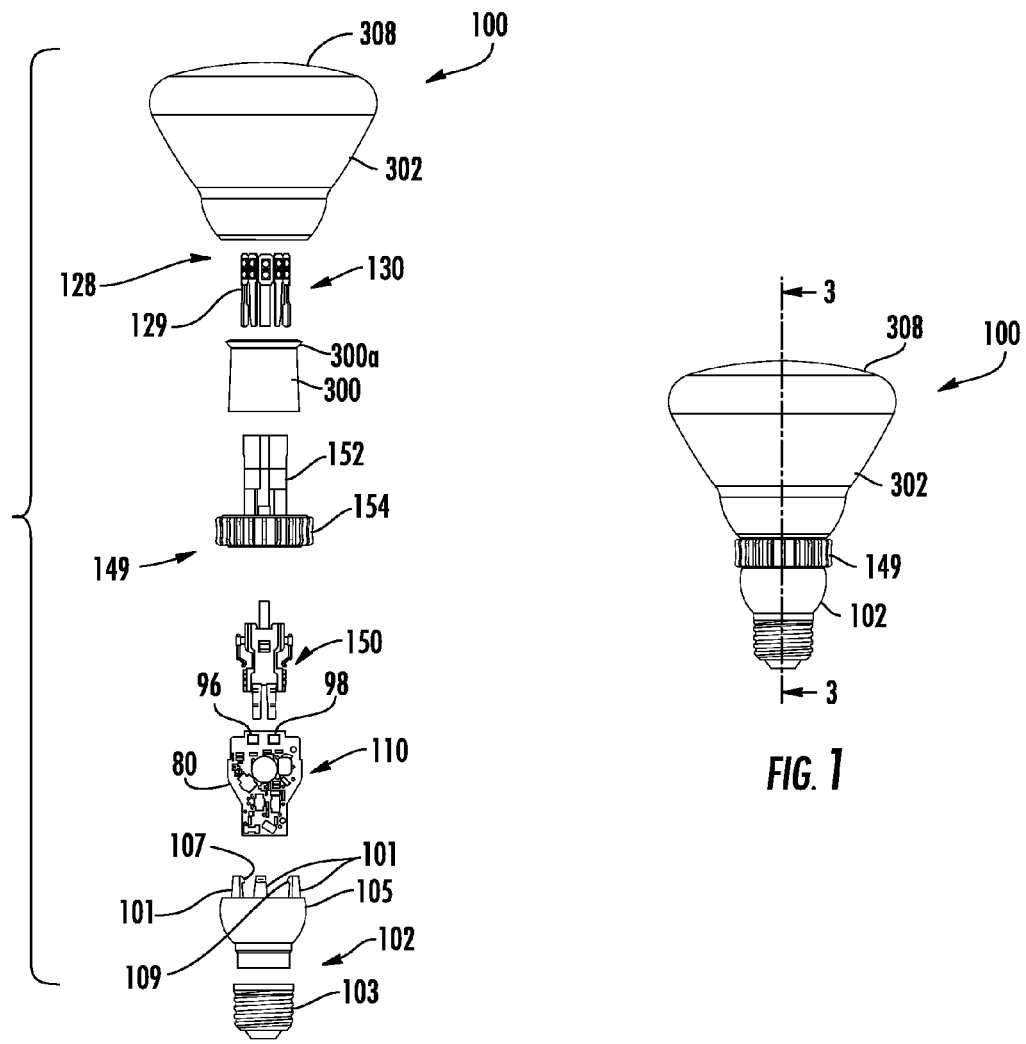

LED LAMP AND HYBRID REFLECTOR

BACKGROUND

Light emitting diode (LED) lighting systems are becoming more prevalent as replacements for legacy lighting systems. LED systems are an example of solid state lighting (SSL) and have advantages over traditional lighting solutions such as incandescent and fluorescent lighting because they use less energy, are more durable, operate longer, can be combined in multi-color arrays that can be controlled to deliver virtually any color light, and generally contain no lead or mercury. A solid-state lighting system may take the form of a luminaire, lighting unit, light fixture, light bulb, or a "lamp".

An LED lighting system may include, for example, a packaged light emitting device including one or more light emitting diodes (LEDs), which may include inorganic LEDs, which may include semiconductor layers forming p-n junctions and/or organic LEDs (OLEDs), which may include organic light emission layers. Light perceived as white or near-white may be generated by a combination of red, green, and blue ("RGB") LEDs. Output color of such a device may be altered by separately adjusting supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

An LED lamp may be made with a form factor that allows it to replace a standard incandescent bulb, or any of various types of fluorescent lamps. LED lamps often include some type of optical element or elements to allow for localized mixing of colors, collimate light, or provide a particular light pattern. Sometimes the optical element also serves as an envelope or enclosure for the electronics and or the LEDs in the lamp. Since, ideally, an LED lamp designed as a replacement for a traditional incandescent or fluorescent light source needs to be self-contained; a power supply is included in the lamp structure along with the LEDs or LED packages and the optical components. A heatsink is also often needed to cool the LEDs and/or power supply in order to maintain appropriate operating temperature.

SUMMARY OF THE INVENTION

In some embodiments, a lamp comprises an enclosure having a reflective surface and an exit surface through which light is emitted from the enclosure and a base connected to the enclosure. An LED is located in the enclosure and is operable to emit light. The reflective surface comprises a first layer and a second reflective layer over the first layer.

The first reflective layer may comprise a reflective surface. The first reflective layer may comprise a metalized surface. The metalized surface may comprise aluminum. The second layer may comprise a transparent carrier mixed with a reflective media. The reflective media may have an index of refraction between approximately 2.5 and 2.7. The second layer may comprise a transparent silicone. The second layer may comprise $TiO_2$, Barium Sulfate and/or ZnO. The second layer may comprise a dielectric material. The second layer may comprise a diffuse reflector. The lamp may further comprise a base through which an electrical path is formed to energize the at least one LED. The enclosure may be made of an optically transmissive material and a portion of the enclosure that is closer to the base may be covered by the first reflective layer. The second reflective layer may cover the first reflective layer and may extend beyond the first reflective layer onto the optically transmissive material. The second reflective layer is coincident with the first reflective layer. The second layer may comprise a transparent silicone mixed with $TiO_2$. The second layer may comprise approximately 20% $TiO_2$ by volume. The second layer may comprise particles of $TiO_2$. The size of the particles may be in a range of approximately 50 nm to approximately 1 micron and may be approximately 200 nm. The second layer may correspond substantially to the first layer. The second layer may comprise silver. The second layer may comprise a highly reflective, thin film anodic coating. The second layer may comprise a highly reflective white polyester paint powder coat. The first layer may comprise an opaque surface. The first layer may be located on an inside surface of the enclosure and the second reflective layer may be disposed over the first layer. The second reflective layer may be located on an exterior surface of the enclosure and the first layer may be located over the second layer. The second reflective layer may be located on an inside surface of the enclosure and first layer may be disposed on an exterior surface of the enclosure substantially coextensive with the second reflective layer. The first layer may comprise a reflective material and may be located on an inside surface of the enclosure and the second reflective layer may be disposed over the first layer.

In some embodiments, a method of making an enclosure for a lamp comprises providing an enclosure having a first layer of reflective metal; filling the enclosure with a mixture of clear silicone and a reflective media; draining the mixture from the enclosure; and curing the mixture using heat.

In some embodiments, a lamp comprises an enclosure having a reflective surface and an exit surface through which light is emitted from the enclosure and a base. An LED is located in the enclosure and is operable to emit light when energized through an electrical path from the base. The reflective surface comprises an exposed reflective layer comprising a mixture of transparent silicone and $TiO_2$.

BRIEF DESCRIPTION OF THE DRAWINGS

FIG. 1 is a plan view of an embodiment of a lamp of the invention.

FIG. 2 is an exploded perspective view of the lamp of FIG. 1.

DETAILED DESCRIPTION

Figure 3:
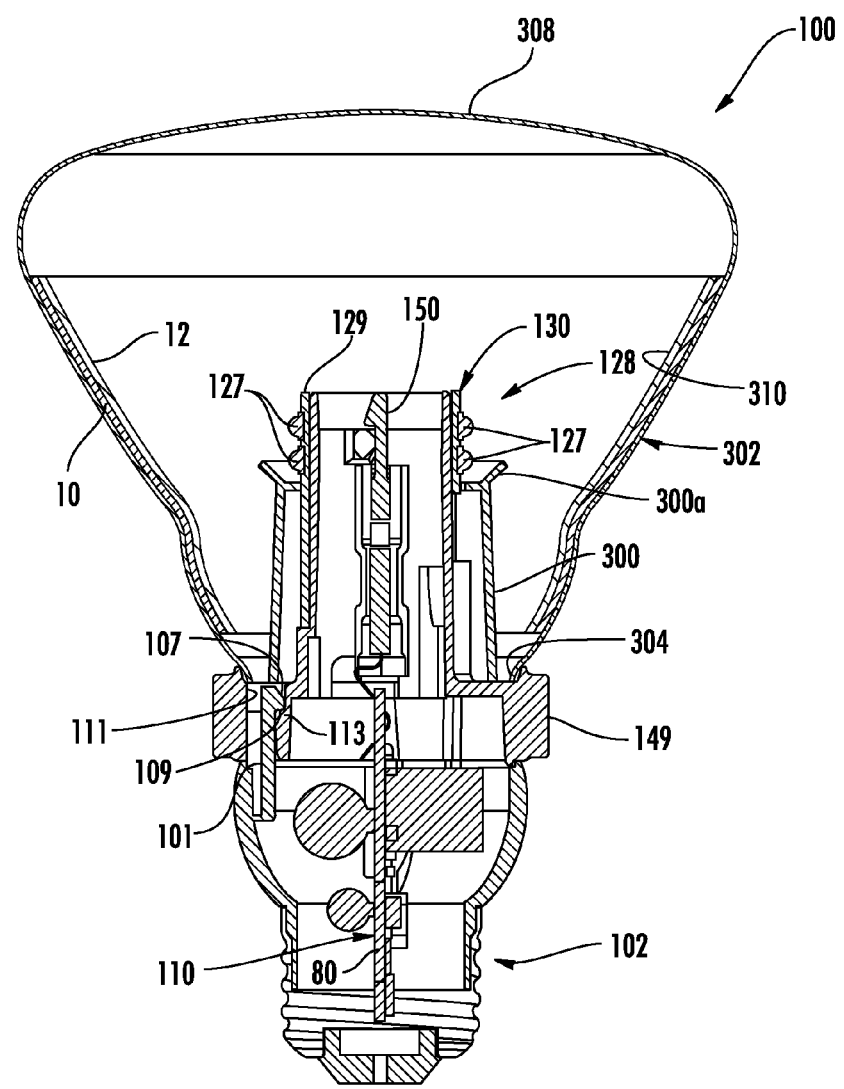
FIG. 3 is a section view taken along line 3-3 of FIG. 1.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Embodiments of the present invention provide a solid-state lamp with centralized light emitters, more specifically, LEDs. Multiple LEDs can be used together, forming an LED array. The LEDs can be mounted on or fixed within the lamp in various ways. In at least some example embodiments, a submount is used. The LEDs are disposed at or near the central portion of the structural envelope of the lamp. Since the LED array may be configured in some embodiments to reside centrally within the structural envelope of the lamp, a lamp can be constructed so that the light pattern is not adversely affected by the presence of a heat sink and/or mounting hardware, or by having to locate the LEDs close to the base of the lamp. It should also be noted that the term "lamp" is meant to encompass not only a solid-state replacement for a traditional incandescent bulb as illustrated herein, but also replacements for fluorescent bulbs, replacements for complete fixtures, and any type of light fixture that may be custom designed as a solid state fixture for mounting on walls, in or on ceilings, on posts, and/or on vehicles.

FIGS. 1 through 3 show a lamp, 100, according to some embodiments of the present invention. Lamp 100 may comprise an Edison base 102 and may be designed to serve as a solid-state replacement for a directional lamp, such as a BR-style lamp, or any lamp that uses a light reflecting surface. The LEDs 127 of LED array 128 are mounted on a submount 129 to create an LED assembly 130. In the present invention the term "submount" is used to refer to the support structure that supports the individual LEDs or LED packages and in one embodiment comprises a printed circuit board or "PCB" although it may comprise other structures such as a lead frame extrusion or the like or combinations of such structures.

Figure 9:
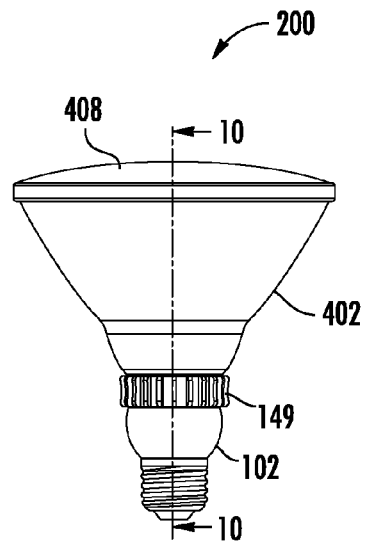
FIG. 9 is a plan view of an alternate embodiment of the lamp of the invention.
Figure 10:
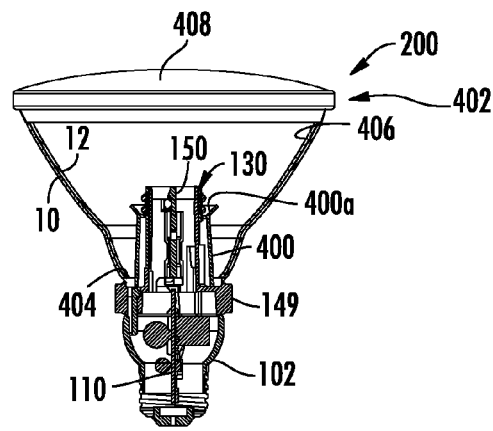
FIG. 10 is a section view taken along line 10-10 of FIG. 9.
Figure 11:
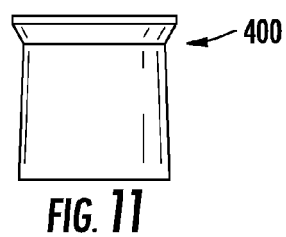
FIG. 11 is a side view of an embodiment of a reflector.
Figure 12:
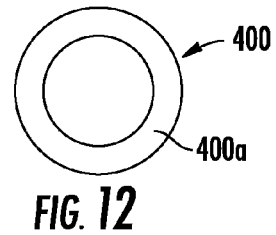
FIG. 12 is a top view of the reflector of FIG. 11.
Figure 13:
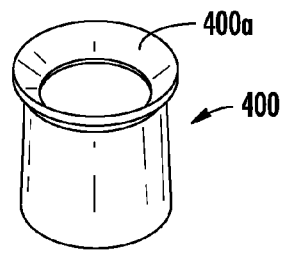
FIG. 13 is a perspective view of the reflector of FIG. 11.
Figure 14:
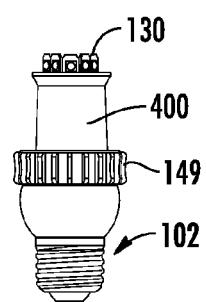
FIG. 14 is a side view of the assembly of FIG. 11.
Figure 15:
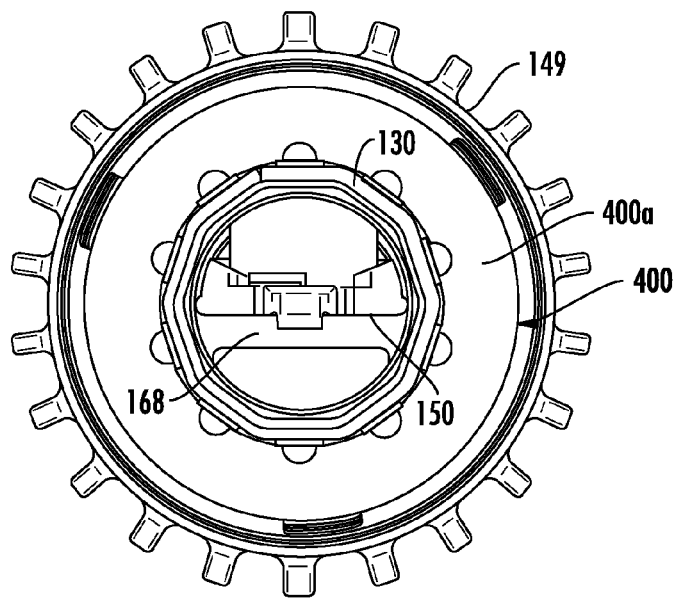
FIG. 15 is a top view showing the reflector and LED assembly and heat sink of the embodiment of FIG. 11.
Figure 16:
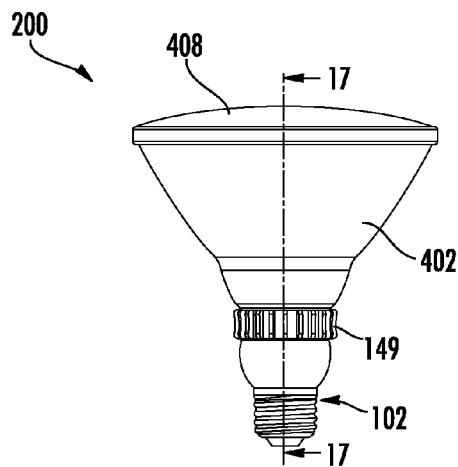
FIG. 16 is a front view of an alternate embodiment of the lamp of the invention.

Enclosure 302 is, in some embodiments, made of glass, quartz, borosilicate, silicate, polycarbonate, other plastic or other suitable material. The enclosure 302 has an interior reflective surface 310 for reflecting light in a directional pattern. Standard BR type bulbs are reflector bulbs that reflect light in a directional pattern; however, the beam angle is not tightly controlled and may be up to about 90-100 degrees or other fairly wide angles. In comparison, in a PAR-style lamp such as lamp 200 shown in FIGS. 9 and 10, the enclosure 402 has an interior reflective surface 406 that may be parabolic and may deliver a more tightly controlled directional light beam. Standard PAR bulbs are reflector bulbs that reflect light in a direction where the beam angle is tightly controlled using a parabolic reflector. PAR lamps may direct the light in a pattern having a tightly controlled beam angle such as, but not limited to, 10°, 25° and 40°.

A lamp base 102 such as an Edison base functions as the electrical connector to connect the lamp 100, 200 to an electrical socket or other connector. Depending on the embodiment, other base configurations are possible to make the electrical connection such as other standard bases or non-traditional bases.

In some embodiments, a driver and/or power supply are included with the LED array 128 on the submount 129. In other embodiments the driver and/or power supply are included in the base 102 as shown. The power supply and drivers may also be mounted separately where components of the power supply are mounted in the base 102 and the driver is mounted with the submount 129 in the enclosure 302, 402. Base 102 may include a power supply or driver and form all or a portion of the electrical path between the mains and the LEDs 127. The base 102 may also include only part of the power supply circuitry while some smaller components reside on the submount 129. In some embodiments any component that goes directly across the AC input line may be in the base 102 and other components that assist in converting the AC to useful DC may be in the enclosure 302, 402. In one example embodiment, the inductors and capacitor that form part of the EMI filter are in the Edison base. Suitable power supplies and drivers are described in U.S. patent application Ser. No. 13/462,388 filed on May 2, 2012 and titled "Driver Circuits for Dimmable Solid State Lighting Apparatus" which is incorporated herein by reference in its entirety; U.S. patent application Ser. No. 12/775,842 filed on May 7, 2010 and titled "AC Driven Solid State Lighting Apparatus with LED String Including Switched Segments" which is incorporated herein by reference in its entirety; U.S. patent application Ser. No. 13/192,755 filed Jul. 28, 2011 titled "Solid State Lighting Apparatus and Methods of Using Integrated Driver Circuitry" which is incorporated herein by reference in its entirety; U.S. patent application Ser. No. 13/339,974 filed Dec. 29, 2011 titled "Solid-State Lighting Apparatus and Methods Using Parallel-Connected Segment Bypass Circuits" which is incorporated herein by reference in its entirety; U.S. patent application Ser. No. 13/235,103 filed Sep. 16, 2011 titled "Solid-State Lighting Apparatus and Methods Using Energy Storage" which is incorporated herein by reference in its entirety; U.S. patent application Ser. No. 13/360,145 filed Jan. 27, 2012 titled "Solid State Lighting Apparatus and Methods of Forming" which is incorporated herein by reference in its entirety; U.S. patent application Ser. No. 13/338,095 filed Dec. 27, 2011 titled "Solid-State Lighting Apparatus Including an Energy Storage Module for Applying Power to a Light Source Element During Low Power Intervals and Methods of Operating the Same" which is incorporated herein by reference in its entirety; U.S. patent application Ser. No. 13/338,076 filed Dec. 27, 2011 titled "Solid-State Lighting Apparatus Including Current Diversion Controlled by Lighting Device Bias States and Current Limiting Using a Passive Electrical Component" which is incorporated herein by reference in its entirety; and U.S. patent application Ser. No. 13/405,891 filed Feb. 27, 2012 titled "Solid-State Lighting Apparatus and Methods Using Energy Storage" which is incorporated herein by reference in its entirety.

The AC to DC conversion may be provided by a boost topology to minimize losses and therefore maximize conversion efficiency. The boost supply is connected to high voltage LEDs operating at greater than 200V. Other embodiments are possible using different driver configurations, or a boost supply at lower voltages.

With the illustrated embodiments, as with many other embodiments of the invention, the term "electrical path" can be used to refer to the entire electrical path to the LED array 128, including an intervening power supply disposed between the electrical connection that would otherwise provide power directly to the LEDs and the LED array, or it may be used to refer to the connection between the mains and all the electronics in the lamp, including the power supply. The term may also be used to refer to the connection between the power supply and the LED array. Electrical conductors run between the LED assembly 130 and the lamp base 102 to carry both sides of the supply to provide critical current to the LEDs 127 as will be described.

The LED assembly 130 may be implemented using a printed circuit board ("PCB") and may be referred by in some cases as an LED PCB. In some embodiments the LED PCB comprises the submount 129. The lamp 100 comprises a solid-state lamp comprising a LED assembly 130 with light emitting LEDs 127. Multiple LEDs 127 can be used together, forming the LED array 128. The LEDs 127 can be mounted on or fixed within the lamp in various ways. In at least some example embodiments, submount 129 is used. The LED assembly 130 comprises a submount 129 arranged such that the LED array 128 is substantially in the center of the enclosure 302, 402.

In one embodiment, the LED assembly 130 has a maximum outer dimension that fits into the open neck 304, 404 of the enclosure 304, 402 during the manufacturing process and an internal dimension that is at least as wide as the width or diameter of the heat conducting portion 152 of heat sink 149.

The LEDs 127 in the LED array 128 include LEDs which may comprise an LED die disposed in an encapsulant such as silicone, and LEDs which may be encapsulated with a phosphor to provide local wavelength conversion, as will be described later when various options for creating white light are discussed. A wide variety of LEDs and combinations of LEDs may be used in the LED assembly 130 as described herein. The LEDs 127 of the LED array 128 are operable to emit light when energized through the electrical path.

In some embodiments a gas movement device (not shown) may be provided within the enclosure 302, 402 to increase the heat transfer between the LEDs 127 and LED assembly 130 and heat sink 149. The movement of the gas over the LED assembly 130 moves the gas boundary layer on the components of the LED assembly 130. In some embodiments the gas movement device comprises a small fan. The fan may be connected to the power source that powers the LEDs 127. While the gas movement device may comprise an electric fan, the gas movement device may comprise a wide variety of apparatuses and techniques to move air inside the enclosure such as a rotary fan, a piezoelectric fan, corona or ion wind generator, synjet diaphragm pumps or the like.

Figure 4:
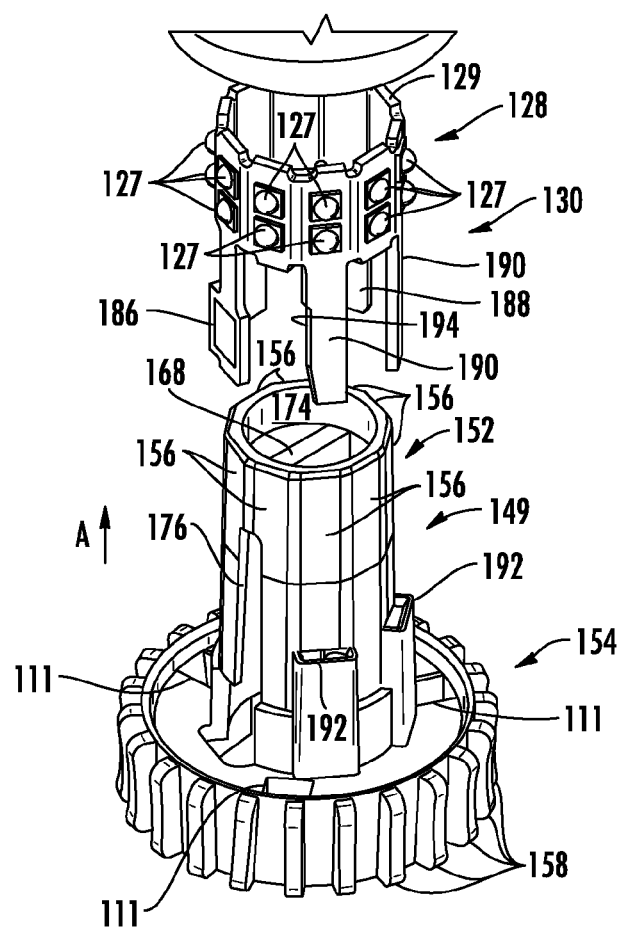
FIG. 4 is an exploded view showing an embodiment of the heat sink and LED assembly of FIG. 1.
Figure 7:
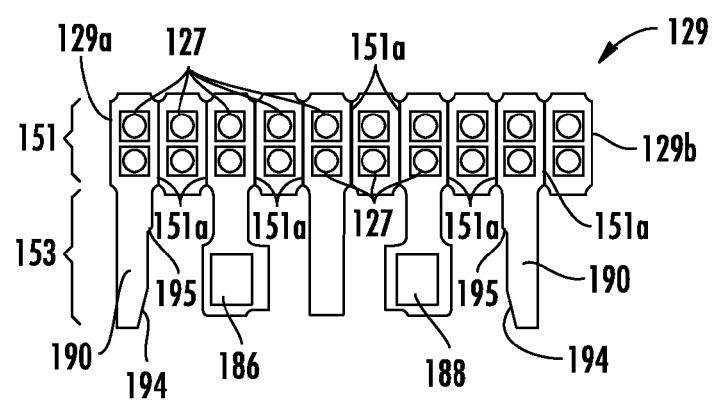
FIG. 7 is a side view of an embodiment of a MCPCB submount usable in embodiments of the lamp of the invention.
Figure 8:
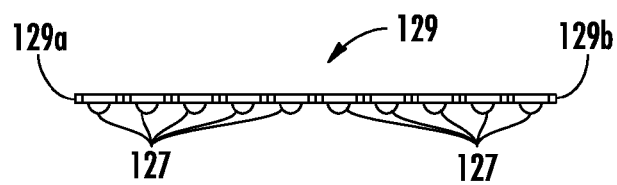
FIG. 8 is an end view of the embodiment of the MCPCB submount of FIG. 7.

Referring to FIGS. 7 and 8, in some embodiments, the submount 129 may comprise a PCB, metal core board, metal core printed circuit board or other similar structure. The submount may be made of a thermally conductive material. The entire area of the submount 129 may be thermally conductive such that the entire LED assembly 130 transfers heat to the heat sink 149. The submount 129 comprises a first LED mounting portion 151 that functions to mechanically and electrically support the LEDs 127 and a second connector portion 153 that functions to provide thermal, electrical and mechanical connections to the LED assembly 130 as shown in FIGS. 3 and 4. The submount 129 may be bent into the configuration of the LED assembly 130 as shown in the figures.

In one embodiment, the enclosure and base are dimensioned to be a replacement for BR-style and PAR-style lamps. While specific reference has been made with respect to PAR-style lamps and BR-style lamps. In other embodiments, the LED lamp can have any shape, including standard and non-standard shapes.

The base 102 comprises an electrically conductive Edison screw 103 for connecting to an Edison socket and a housing portion 105 connected to the Edison screw. The Edison screw 103 may be connected to the housing portion 105 by adhesive, mechanical connector, welding, separate fasteners or the like. The housing portion 105 may comprise an electrically insulating material such as plastic. Further, the material of the housing portion 105 may comprise a thermally conductive material such that the housing portion 105 may form part of the heat sink structure for dissipating heat from the lamp 100. The housing portion 105 and the Edison screw 103 define an internal cavity for receiving the electronics 110 of the lamp including the power supply and/or drivers or a portion of the electronics for the lamp. The lamp electronics 110 are electrically coupled to the Edison screw 103 such that the electrical connection may be made from the Edison screw 103 to the lamp electronics 110. The base 102 may be potted to physically and electrically isolate and protect the lamp electronics 110. The lamp electronics 110 include a first contact pad 96 and a second contact pad 98 that allow the lamp electronics 110 to be electrically coupled to the LED assembly 130 in the lamp as will hereinafter be described. Contact pads 96 and 98 may be formed on printed circuit board 80 which includes the power supply, including large capacitor and EMI components that are across the input AC line along with the driver circuitry as described herein.

In some embodiments, the submount 129 of the LED assembly 130 may comprise a lead frame made of an electrically conductive material such as copper, copper alloy, aluminum, steel, gold, silver, alloys of such metals, thermally conductive plastic or the like. In other embodiments, the submount comprises a PCB such as a metal core PCB (MCPCB) as shown in FIGS. 4, 7 and 8. In one embodiment, the exposed surfaces of the submount 129 may be coated with silver or other reflective material to reflect light inside of enclosure 302, 402 during operation of the lamp. The submount may comprise a series of anodes and cathodes arranged in pairs for connection to the LEDs 127. An LED or LED package containing at least one LED 127 is secured to each anode and cathode pair where the LED/LED package spans the anode and cathode. The LEDs/LED packages may be attached to the submount by soldering. In the illustrated embodiment 20 pairs of anodes and cathodes are shown for an LED assembly having 20 LEDs; however, a greater or fewer number of anode/cathode pairs and LEDs may be used. Moreover, more than one submount may be used to make a single LED assembly 130. Connectors or conductors such as traces connect the anode from one pair to the cathode of the adjacent pair to provide the electrical path between the anode/cathode pairs during operation of the LED assembly 130.

The MCPCB comprises a thermally and electrically conductive core made of aluminum or other similar pliable metal material. The core is covered by a dielectric material such as polyimide. Metal core boards allow traces to be formed therein. In one method, the core board is formed as a flat member and is bent into a suitable shape. Because the core board is made of thin bendable material and the anodes and cathodes may be positioned in a wide variety of locations, and the number of LED packages may vary, the metal core board may be configured such that it may be bent into a wide variety of shapes and configurations.

Referring to FIGS. 7 and 8, in one embodiment the MCPCB is formed as a flat member having a first LED mounting portion 151 on which the LEDs/LED packages containing LEDs 127 are mounted. The first portion 151 may be divided into sections by thinned areas or score lines 151a. The LEDs/LED packages are located on the sections such that the core board may be bent along the score lines to form the planar core board into a variety of three-dimensional shapes where the shape is selected to project a desired light pattern from the lamp 100.

In another embodiment of the LED assembly 130 the submount 129 comprises a hybrid of a metal core board and lead frame. The metal core board forms the LED mounting portion 151 on which the LED packages containing LEDs 127 are mounted where the back side of the metal core board may be mechanically coupled to a lead frame structure. The lead frame structure forms the connector portion 153. Both the lead frame and the metal core board may be bent into the various configurations as discussed herein.

The submount 129 may be bent or folded or otherwise shaped such that the LEDs 127 provide the desired light pattern in lamp 100. In one embodiment the submount 129 is bent into a cylindrical shape as shown in the figures. The LEDs 127 are disposed about the axis of the cylinder such that light is projected outward. The LEDs 127 may be arranged around the perimeter of the LED assembly to project light radially. Because the submount 129 is pliable and the LED placement on the substrate may be varied, the submount may be formed and bent into a variety of configurations. The angles of the LEDs and the number of LEDs may be varied to create a desired light pattern.

The LED assembly 130 may be advantageously bent or formed into any suitable three-dimensional shape. A "three-dimensional" LED assembly as used herein and as shown in the drawings means an LED assembly where the substrate comprises mounting surfaces for different ones of the LEDs that are in different planes such that the LEDs mounted on those mounting surfaces are also oriented in different planes. In some embodiments the planes are arranged such that the LEDs are disposed over a 360 degree range. The substrate may be bent from a flat configuration, where all of the LEDs are mounted in a single plane on a generally planar member, into a three-dimensional shape where different ones of the LEDs and LED mounting surfaces are in different planes.

With respect to the features described above with various example embodiments of a lamp, the features can be combined in various ways. For example, the various methods of including phosphor in the lamp can be combined and any of those methods can be combined with the use of various types of LED arrangements such as bare die vs. encapsulated or packaged LED devices. The embodiments shown herein are examples only, shown and described to be illustrative of various design options for a lamp with an LED array.

LEDs and/or LED packages used with an embodiment of the invention and can include light emitting diode chips that emit hues of light that, when mixed, are perceived in combination as white light. Phosphors can be used as described to add yet other colors of light by wavelength conversion. For example, blue or violet LEDs can be used in the LED assembly of the lamp and the appropriate phosphor can be in any of the ways mentioned above. LED devices can be used with phosphorized coatings packaged locally with the LEDs or with a phosphor coating the LED die as previously described. For example, blue-shifted yellow (BSY) LED devices, which typically include a local phosphor, can be used with a red phosphor on or in the optically transmissive enclosure or inner envelope to create substantially white light, or combined with red emitting LED devices in the array to create substantially white light.

A lighting system using the combination of BSY and red LED devices referred to above to make substantially white light can be referred to as a BSY plus red or "BSY+R" system. In such a system, the LED devices used include LEDs operable to emit light of two different colors. In one example embodiment, the LED devices include a group of LEDs, wherein each LED, if and when illuminated, emits light having dominant wavelength from 440 to 480 nm. The LED devices include another group of LEDs, wherein each LED, if and when illuminated, emits light having a dominant wavelength from 605 to 630 nm. A phosphor can be used that, when excited, emits light having a dominant wavelength from 560 to 580 nm, so as to form a blue-shifted-yellow light with light from the former LED devices. In another example embodiment, one group of LEDs emits light having a dominant wavelength of from 435 to 490 nm and the other group emits light having a dominant wavelength of from 600 to 640 nm. The phosphor, when excited, emits light having a dominant wavelength of from 540 to 585 nm. A further detailed example of using groups of LEDs emitting light of different wavelengths to produce substantially while light can be found in issued U.S. Pat. No. 7,213,940, which is incorporated herein by reference.

Referring again to FIGS. 2-6, the LED assembly 130 may be mounted to the heat sink structure 149 by an electrical interconnect 150 where the electrical interconnect 150 provides the electrical connection between the LED assembly 130 and the lamp electronics 110. The heat sink structure 149 comprises a heat conducting portion or tower 152 and a heat dissipating portion 154 as shown for example in FIGS. 4 and 36. In one embodiment the heat sink 149 is made as a one-piece member of a thermally 36 conductive material such as aluminum. The heat sink 149 may also be made of multiple components secured together to form the heat sink. Moreover, the heat sink 149 may be made of any thermally conductive material or combinations of thermally conductive materials. The heat conducting portion 152 may be formed as a tower that is dimensioned and configured to make good thermal contact with the LED assembly 130 such that heat generated by the LED assembly 130 may be efficiently transferred to the heat sink 149. The heat sink 149 may be formed in a wide variety of shapes and sizes provided that sufficient heat is conducted away from the LED assembly 130 that the operation and/or life expectancy of the LEDs are not adversely affected.

The heat dissipating portion 154 is thermally coupled with the heat conducting portion 152 such that heat conducted away from the LED assembly 130 by the heat conducting portion 152 may be efficiently dissipated from the lamp 100, 200 by the heat dissipating portion 154. In one embodiment the heat conducting portion 152 and heat dissipating portion 154 are formed as one-piece. The heat dissipating portion 154 extends from the interior of the enclosure 302, 402, to the exterior of the lamp 100, 200 such that heat may be dissipated from the lamp to the ambient environment. In one embodiment the heat dissipating portion 154 is formed generally as a disk where the distal edge of the heat dissipating portion 154 extends outside of the lamp and forms an annular ring that sits on top of the open end of the base 102. A plurality of heat dissipating members 158 may be formed on the exposed portion to facilitate the heat transfer to the ambient environment. In one embodiment, the heat dissipating members 158 comprise a plurality fins that extend outwardly to increase the surface area of the heat dissipating portion 154. The heat dissipating portion 154 and fins 158 may have any suitable shape and configuration. One particularly suitable arrangement of the fins will be described.

The LED assembly 130 may thermally couple to the heat sink 149 in a variety of manners. For example, the heat sink may only comprise the heat dissipating portion 154 and the heat conducting portion or tower 152 may be integrated with the LED assembly 130 such that the integrated heat sink portion and LED assembly engage the heat dissipating portion 154 at its base. In other embodiments, the LED assembly 130 may engage the heat conducting portion 152 of the heat sink 149 where the LED assembly does not include the connector portion 153. In some embodiments, the LED assembly and heat sink may be integrated into a single piece or be multiple pieces other than as specifically defined.

Figure 5:
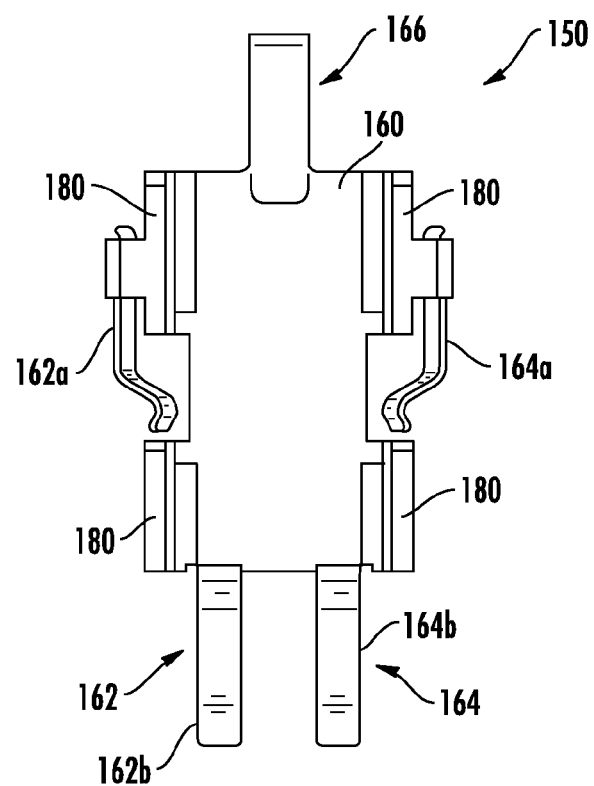
FIG. 5 is a plan view showing an embodiment of the electrical interconnect of FIG. 1.
Figure 6:
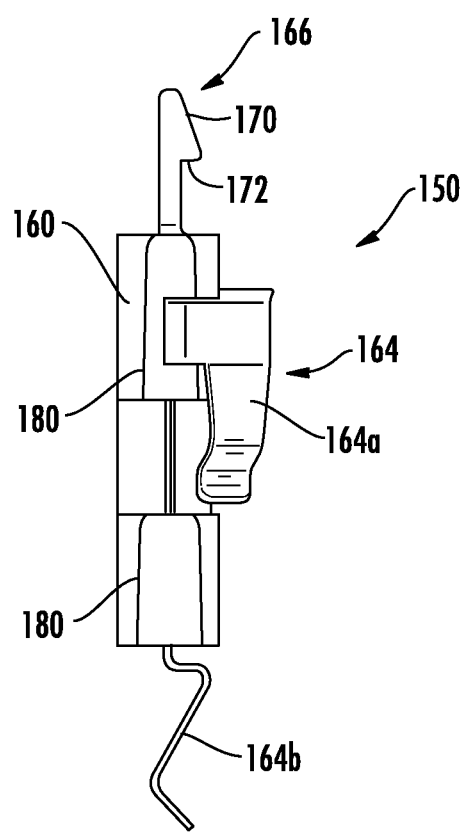
FIG. 6 is a side view showing an embodiment of the electrical interconnect of FIG. 1.

The electrical interconnect 150 provides the electrical conductors to connect the LED assembly 130 to the lamp electronics 110. A support and/or alignment arrangement is configured to position the first and/or second set of contacts relative to the corresponding electrical contacts of the LED assembly and power supply, AC line or drive electronics depending on the embodiment. The electrical interconnect enables this connection to be made in an easy fashion to improve manufacturability by reducing the need for soldering of the electrical contacts. As shown in FIGS. 5 and 6, the electrical interconnect 150 comprises a body 160 that includes a first conductor 162 for connecting to one of the anode or cathode side of the LED assembly 130 and a second conductor 164 for connecting to the other one of the anode or cathode side of the LED assembly 130. The first conductor 162 forms an LED-side contact 162a and a lamp electronics-side contact 162b. The second conductor 164 forms an LED-side contact 164a and a lamp electronics-side contact 164b.

The support and/or alignment mechanism may comprise a first engagement member 166 on body 160 that engages a mating second engagement member 168 on the heat sink 149. In one embodiment the first engagement member 166 comprises a deformable resilient finger that comprises a camming surface 170 and a lock member 172. The second engagement member 168 comprises a fixed member located in the internal cavity 174 of the heat sink 149. The electrical interconnect 150 may be inserted into the cavity 174 from the bottom of the heat sink 149 and moved toward the opposite end of the heat sink such that the resilient snap-fit engagement of the lock member 172 with the fixed member 168 fixes the electrical interconnect 150 in position in the heat sink 149. The snap-fit connection allows the electrical interconnect 150 to be inserted into and fixed in the heat sink 149 in a simple insertion operation without the need for any additional connection mechanisms, tools or assembly steps.

The support and/or alignment arrangement may properly orient the electrical interconnect 150 in the heat sink 149 and provide a passage for the LED-side contacts 162a, 164a, and may comprise a first slot 176 and a second slot 178 formed in the heat conducting portion 152. The first slot 176 and the second slot 178 may be arranged opposite to one another and receive ears or tabs 180 that extend from the body 160 such that as the electrical interconnect 150 is inserted into the heat sink 149, the tabs 180 engage the slots 176, 178 to guide the electrical interconnect 150 into the heat sink 149.

The first LED-side contact 162a and the second LED-side contact 164a are arranged such that the contacts extend through the first and second slots 176, 178, respectively, and are exposed on the outside of the heat conducting portion 152. The contacts 162a, 164a are arranged such that they create an electrical connection to the anode side and the cathode side of the LED assembly 130 when the LED assembly 130 is mounted on the heat sink 149.

The first electronic-side contact 162b and the second electronic-side contact 164b are arranged such that the contacts 162b, 164b extend beyond the bottom of the heat sink 149 when the electrical interconnect 150 is inserted into the heat sink 149. The contacts 162b, 164b are arranged such that they create an electrical connection to the anode side and the cathode side of the lamp electronics 110.

To mount the LED assembly 130 on the heat sink 149 the heat conducting portion 152 of heat sink 149 is inserted into the LED assembly 130 such that the LED assembly 130 surrounds and contacts the heat conducting portion 152. The LED assembly 130 comprises an anode side contact 186 and a cathode side contact 188. The contacts 186, 188 may be formed as part of the conductive submount 129 on which the LEDs are mounted. The contacts 186, 188 are electrically coupled to the LEDs 127 such that they form part of the electrical path between the lamp electronics 110 and the LED assembly 130. The contacts 186, 188 extend from the LED mounting portion 151 such that when the LED assembly 130 is mounted on the heat sink 149 the contacts 186, 188 engage the LED-side contacts 162a, 164a to ensure a good electrical coupling between the LED-side contacts 162a, 164a and the LED assembly 130.

To position the LED assembly 130 relative to the heat sink and to fix the LED assembly 130 to the heat sink, a pair of extensions 190 are provided on the LED assembly 130 that engage mating receptacles 192 formed on the heat sink. In one embodiment the extensions 190 comprise portions of the submount 129 that extend away from the LED mounting area 151 of the LED assembly 130. The extensions 190 extend toward the bottom of the heat sink 149 along the direction of insertion of the LED assembly 130 onto the heat sink. The heat sink 149 is formed with mating receptacles 192 that are dimensioned and arranged such that one of the extensions 190 is inserted into each of the receptacles 192 when the heat sink 149 is inserted into the LED assembly 130. The engagement of the extensions 190 and the receptacles 192 properly positions the LED assembly 130 relative to the heat sink during assembly of the lamp.

Moreover, to fix the LED assembly 130 on the heat sink 149 and to seat the LED assembly 130 against the heat conducting portion 152 to ensure good thermal conductivity between these elements, the extensions 190 are formed with camming surfaces 194 that engage the receptacles 192 and clamp the LED assembly 130 on the heat sink 149. It will be appreciated that as the submount is formed into the three-dimensional shape, free ends of the submount 129 may be brought into close proximity to one another. When the planar submount is bent into the three-dimensional cylindrical shape of FIG. 4, the free ends 129a, 129b of the submount 129 are brought closely adjacent to one another. As shown in FIGS. 4 and 7, a surface of each of the extensions 190 is formed as a camming surface 194 such that as each extension 190 is inserted into the corresponding receptacle 192 the wall of the receptacle 192 engages the camming surface 194 and, due to the angle or shape of the camming surface 194, exerts a force on the LED assembly 130 tending to move one free end 129a of the LED assembly 130 toward the opposite free end 129b of the LED assembly 130. As the free ends of the LED assembly 130 are moved toward one another, the inner circumference of the LED assembly 130 is gradually reduced such that the LED assembly 130 exerts a tight clamping force on the heat conducting portion 152. The clamping force holds the LED assembly 130 on the heat sink 149 and ensures a tight surface-to-surface engagement between the LED assembly 130 and the heat sink 149 such that heat generated by the LED assembly 130 is efficiently transferred to the heat sink 149. Other mechanisms for thermally coupling the LEDs or LED assembly to a heat sink may also be used and the exemplary embodiment is by way of example only.

Figure 35:
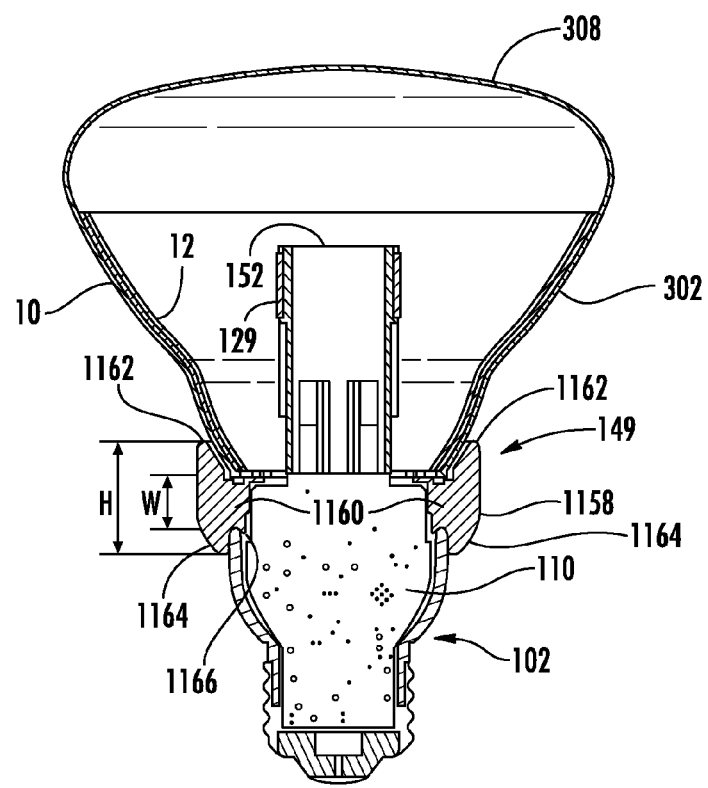
FIG. 35 is a section view of an alternate embodiment of the lamp of the invention.
Figure 37:
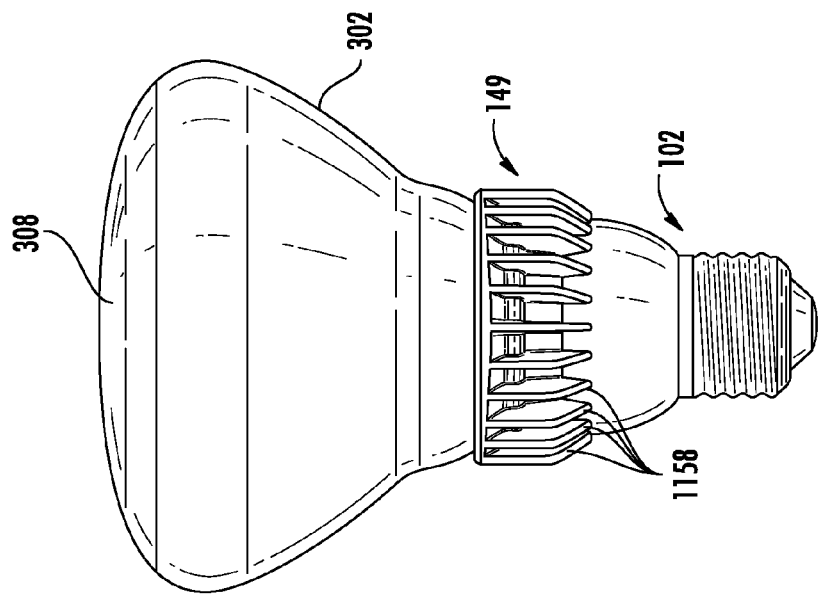
FIG. 37 is a front view of the lamp of FIG. 35.
Figure 36:
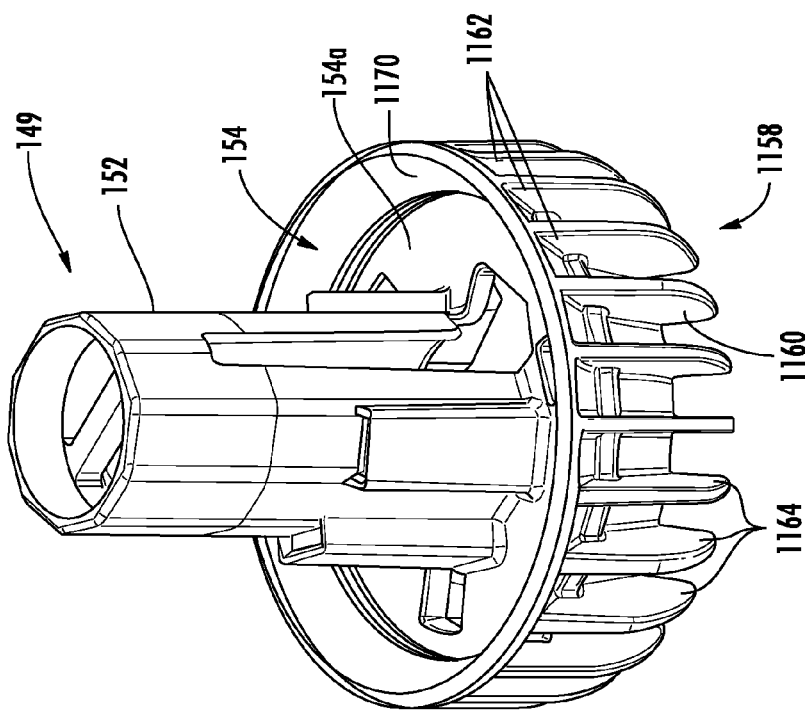
FIG. 36 is a top perspective view of the embodiment of the heat sink of FIG. 35.

Another embodiment of the heat sink and fins is shown in FIGS. 35-37. The heat sink 149 is shown mounted in a directional lamp. The heat sink 149 comprises a heat conducting portion 152 that is thermally coupled to the LEDs 127 as previously described and a heat dissipating portion 154 that is thermally coupled to the LEDs 127 via the heat conducting portion 152. The heat dissipating portion 154 has a first part that is disposed in the enclosure 302, 402 and a second part that is disposed outside of the enclosure.

The heat dissipating portion 154 comprises a plurality of fins 1158 that extend from the heat dissipating portion 154 generally radially such that the fins 1158 extend to the outside of the enclosure 302, 402 and base 102 and are exposed to the ambient environment. The fins 1158 may be formed with cantilevered overhang portions or lips 1162 and 1164 that extend along the longitudinal axis of the lamp from the top and bottom of stem 1160. The upper overhang 1162 extends over the bottom portion of the enclosure 302, 402 and the lower overhang 1164 extends over the top portion of the base 102. By extending the fins 1158 in such a manner the surface area of the exposed portion of the heat sink 149 that is in contact with the ambient environment is increased without significantly increasing the distance the fins 1158 protrude laterally beyond the sides of the lamp as compared to the fins 158 shown in the embodiment of FIG. 1.

Once the heat sink/LED assembly subcomponent is completed, the subcomponent may be attached to the base 102 as a unit. First engagement members on the base 102 may engage mating second engagement members on the heat sink structure 149. In one embodiment, the first engagement members comprise deformable resilient fingers 101 that comprise a camming surface 107 and a lock member 109 (FIG. 2). The second engagement members comprise apertures 111 formed in the heat sink 149 that are dimensioned to receive the fingers 101. The apertures 111 define fixed members 113 that may be engaged by the lock members 109 to lock the fingers 101 to the heat sink 149. The base 102 may be moved toward the bottom of the heat sink 149 such that fingers 101 are inserted into apertures 111. The resilient snap-fit engagement of the lock members 109 with the fixed members 113 fixes the base 102 to the heat sink 149. The snap-fit connection allows the base 102 to be fixed to the heat sink 149 in a simple insertion operation without the need for any additional connection mechanisms, tools or assembly steps.

As the base 102 is brought into engagement with the heat sink 149, electronic-side contacts 162b, 164b are inserted into the base 102. The lamp electronics 110 are provided with contact pads 96, 98 that are arranged such that when the base 102 is assembled to the heat sink 149, the electronic-side contacts 162b, 164b are in electrical contact with the pads 96, 98 to complete the electrical path between the base 102 and the LED assembly 130.

The enclosure 302, 402 may be attached to the heat sink 149. In one embodiment, the LED assembly 130 and the heat conducting portion 152 are inserted into the enclosure 302, 402 through the neck 304, 404. The neck 304, 404 and heat sink dissipation portion 154 are dimensioned and configured such that the rim of the enclosure 302, 402 sits on the upper surface 154a of the heat dissipation portion 154 with the heat dissipation portion 154 disposed at least partially outside of the enclosure 302, 402, between the enclosure 302, 402 and the base 102. To secure these components together a bead of adhesive may be applied to the upper surface 154a of the heat dissipation portion 154. The rim of the enclosure 302, 402 may be brought into contact with the bead of adhesive to secure the enclosure 302, 402 to the heat sink 149 and complete the lamp assembly. In addition to securing the enclosure 302, 402 to the heat sink 149 the adhesive is deposited over the snap-fit connection formed by fingers 101 and apertures 111.

A mechanism used in the lamp of the invention to increase the overall efficiency of the lamp is the use of a boost converter topology power supply to minimize losses and maximize conversion efficiency. Examples of boost topologies are described in U.S. patent application Ser. No. 13/462,388, entitled "Driver Circuits for Dimmable Solid State Lighting Apparatus", filed on May 2, 2012 which is incorporated by reference herein in its entirety; and U.S. patent application Ser. No. 13/662,618, entitled "Driving Circuits for Solid-State Lighting Apparatus with High Voltage LED Components and Related Methods", filed on Oct. 29, 2012 which is incorporated by reference herein in its entirety. With boost technology there is a relatively small power loss when converting from AC to DC. For example, boost technology may be approximately 92% efficient while other power converting technology, such as Bud technology, may be approximately 85% efficient. Using a less efficient conversion technology decreases the efficiency of the system such that significant losses occur in the form of heat. The increase in heat must be dissipated from the lamp because heat adversely affects the performance characteristics of the LEDs. The increase in efficiency using boost technology maximizes power to the LEDs while minimizing heat generated as loss. As a result, use of boost topology, or other highly efficient topology, provides an increase in the overall efficiency of the lamp and a decrease in the heat generated by the power supply.

FIGS. 1-3 show an embodiment of a lamp that uses the LED assembly 130, heat sink with the tower arrangement 149, and electrical interconnect 150 as previously described in a BR type lamp. In the BR lamp shown in FIGS. 1-3 the light is emitted in a directional pattern rather than in an omnidirectional pattern. Standard BR type bulbs are reflector bulbs that reflect light in a directional pattern; however, the beam angle is not tightly controlled and may be up to about 90-100 degrees or other fairly wide angles. The bulb shown in FIGS. 1-3 may be used as a solid state replacement for a BR bulb or for other directional bulb, reflector-type bulbs or other similar bulbs.

As previously explained, the LED assembly 130 generates an omnidirectional light pattern. To create a directional light pattern, a primary reflector 300 is provided that reflects light generated by the LED assembly 130 generally in a direction along the axis of the lamp. Because the lamp is intended to be used as a replacement for a BR type lamp the reflector 300 may reflect the light in a generally wide beam angle and may have a beam angle of up to approximately 90-100 degrees. As a result, the reflector 300 may comprise a variety of shapes and sizes provided that light reflecting off of the reflector 300 is reflected generally along the axis of the lamp. The reflector 300 may, for example, be conical, parabolic, hemispherical, faceted or the like. In some embodiments, the reflector may be a diffuse or Lambertian reflector and may be made of a white highly reflective material such as injection molded plastic, white optics, PET, MCPET, or other reflective materials. The reflector may reflect light but also allow some light to pass through it. The reflector 300 may be made of a specular material. The specular reflectors may be injection molded plastic or die cast metal (aluminum, zinc, magnesium) with a specular coating. Such coatings could be applied via vacuum metallization or sputtering, and could be aluminum or silver. The specular material could also be a formed film, such as 3M's Vikuiti ESR (Enhanced Specular Reflector) film. It could also be formed aluminum, or a flower petal arrangement in aluminum using Alanod's Miro or Miro Silver sheet.

The reflector 300 is mounted in the lamp such that it surrounds the LED assembly 130 and reflects some of the light generated by the LED assembly.

The reflector 300 may be mounted on the heat sink 149 or LED assembly 130 using a variety of connection mechanisms. In one embodiment, the reflector 300 is mounted on the heat conducting portion or tower 152 of the heat sink 149. As shown, the reflector 300 is formed as a slip collar with a flare 300a at the end such that when the LED assembly 130 is inserted, the light directed primarily toward the base encounters the reflector surface of flare 300a and is reflected out the exit surface 308. The LED assembly 130 is mounted as previously described to trap the reflector 300 between the heat sink 149 and the LED assembly 130. The reflector may also be mounted on the dissipating portion 153 of the heat sink. The reflector 300 may also be mounted to the heat sink 149 or LED assembly 130 using separate fasteners, adhesive, friction fit, mechanical engagement such as a snap-fit connection, welding or the like.

In one embodiment, the reflector 300 is made in two portions 350 and 352 that together surround the heat conducting portion or tower 152 and connect to one another using snap-fit connectors 354 to clamp the heat sink therebetween as shown in FIGS. 31-34. In the illustrated embodiment the two portions are identical such that a single component may be used although the two portions may be different. The snap fit connectors 354 may comprise a deformable, resilient tang 356 on one reflector portion that is received in a mating receptacle 358 on the other reflector portion where each reflector portion comprises one tang and one receptacle. However, two tangs may be formed on one portion and two receptacles may be formed on the other portion. The tangs 356 may be inserted into the receptacles 358 such that locking surfaces 360 on the tangs 356 are disposed behind the receptacles 358. The structure of the reflector described above may be used with any of the embodiments of the reflector and in any of the lamps described herein.

The reflector 300 is dimensioned such that the LED assembly 130, heat sink 149 and reflector 300 may be inserted through the opening 304 in the neck of enclosure 302. The LED assembly 130, heat sink 149 and reflector 300 are inserted into the enclosure 302. The enclosure 302 may be secured to the heat sink 149 as previously described using adhesive or other connection mechanism. The enclosure 302 comprises a body that is typically coated on an interior surface with a highly reflective material such as aluminum to create a reflective interior 310 and an exit surface 308 through which the light exits the lamp. The exit surface 308 may be frosted or otherwise treated with a light diffuser material.

As previously explained, the reflector 300 may be positioned such that it reflects some of the light generated by the LED assembly 130. However, at least a portion of the light generated by the LED assembly 130 may not be reflected by the reflector 300. At least some of this light may be reflected by the reflective surface 310 of the enclosure 302. Some of the light generated by the LED assembly 130 may also be projected directly out of the exit surface 308 without being reflected by the primary reflector 300 or the reflective surface 310.

In traditional reflector bulbs the reflective surface typically comprises a metalized reflector surface that is formed on a portion of the interior glass wall of the enclosure. Such surfaces have a wide difference in reflectivity between bulbs. The surfaces are also inefficient in that they typically are only 70-85% reflective. When such a surface is used with low efficiency incandescent filaments a wide variation in the reflectivity of these coatings is deemed acceptable. However, when using these reflective surfaces with LEDs that can have efficacies at 70 LPW or greater such large variations in reflectivity generate 100 lumen or greater differences in the output from lamp to lamp. As a result, LED reflective lamps require higher brightness LEDs, higher power from the power supply or both in order to guarantee that the appropriate minimum lumens are produced for the specified lamp type.

In one embodiment of the lamp of the invention a second reflective layer 12 is placed over the top of the first layer 10 and is exposed to the light emitted from the LEDs to reflect the light toward the exit surface of the lamp. It has been found that adding the second reflective layer 12 over the first reflective layer decreases the variability of reflectivity between lamps from 10%-15% to 2% or less. The reflectivity of the surface is also increased from 70%-85% to over 90% and in some embodiments to over 95%. With the improvements in reflectivity LEDs having a broader flux range may be used and the power requirements may be reduced when compared to LED lamps using traditional reflectorized lamp glass.

In one embodiment, the interior surface of the enclosure, such as a glass enclosure, is covered in a first layer 10. The enclosure 302, 402 may be a diffuse reflector, transparent or may be a specular reflector in those areas where the reflective surface is located. The first layer 10 may comprise a reflective surface such as a metalized surface, such as aluminum, applied to the surface of the enclosure 302. The first reflective layer 10 may comprise a specular surface or a diffuse reflector. The first layer 10 is used to eliminate light leakage through the enclosure 302 and, in some embodiments, is used as the electrically conductive foundation on which to build the second layer 12. While an aluminum layer is described as the first layer 10 and may be the same type of aluminum layer currently used as the reflective layer in directional bulbs, the first layer may comprise other reflective materials. Moreover, where the second reflective layer 12 adequately reflects the light, the function of the first layer 10 is primarily to prevent light leakage through the enclosure. In such embodiments, the first layer 10 may comprise a non-reflective opaque material and does not necessarily need to be a reflective surface. The thicknesses of the layers 10 and 12 as shown in the drawings are greatly exaggerated for explanatory purposes. In actual application the layers are formed as thin coatings or layers on the enclosure and closely follow the shape of the enclosure.

A second reflective layer 12 is applied over the top of the first layer 10. The second layer 12 may comprise a transparent carrier mixed with a reflective media. The second layer 12 may comprise a transparent silicone coating as the carrier that is loaded with $TiO_2$ as the reflective media. One suitable material is sold under the name TI-PURE® titanium dioxide sold by DuPont. Other forms of titanium dioxide from other sources may also be used. In some embodiments the second layer 12 comprises a dielectric material. The second layer 12 may also comprise a diffuse reflector.

Figure 17:
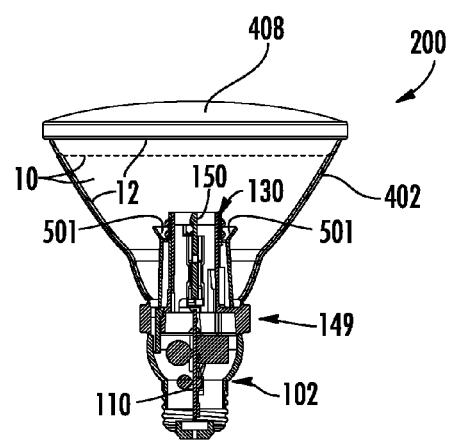
FIG. 17 is a section view taken along line 17-17 of FIG. 16.
Figure 18:
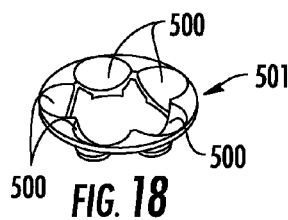
FIG. 18 is a perspective view of an embodiment of a reflector.
Figure 19:
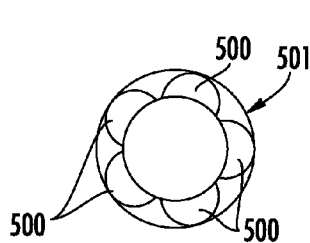
FIG. 19 is a top view of the reflector of FIG. 18.
Figure 20:
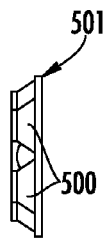
FIG. 20 is a side view of the reflector of FIG. 18.
Figure 21:
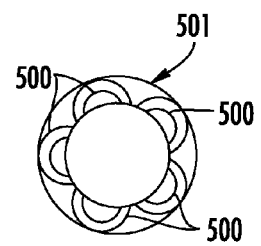
FIG. 21 is a bottom view of the reflector of FIG. 18.
Figure 22:
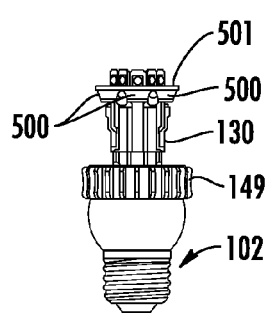
FIG. 22 is a side view of the assembly of FIG. 17.
Figure 23:
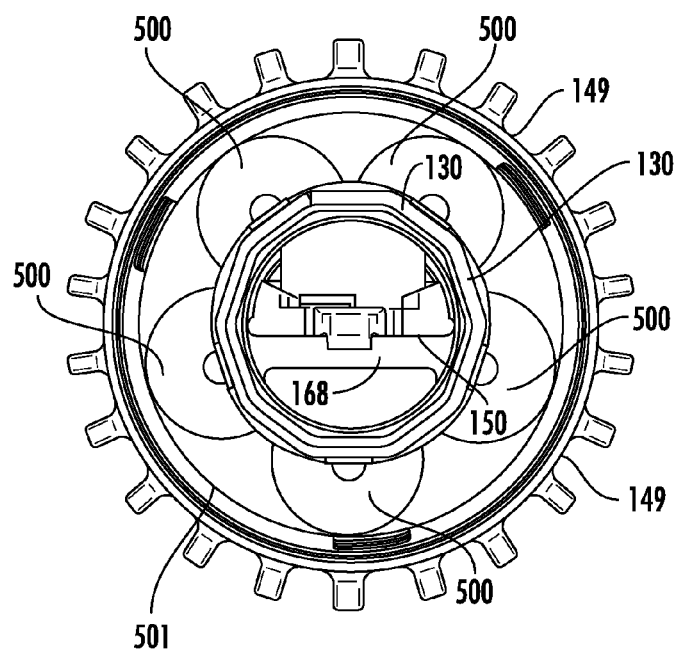
FIG. 23 is a top view showing the reflector and LED assembly and heat sink of the embodiment of FIG. 17.
Figure 24:
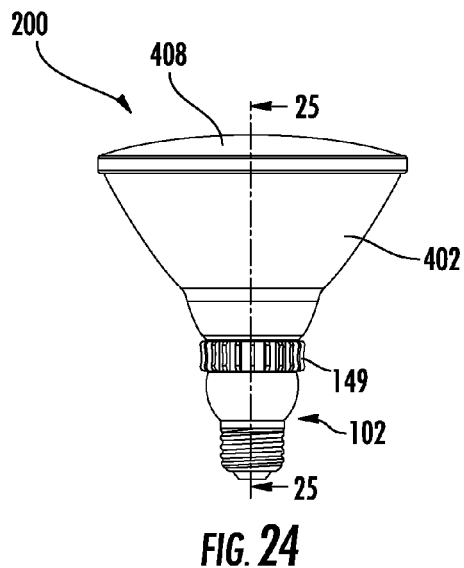
FIG. 24 is a front view of an alternate embodiment of the lamp of the invention.
Figure 25:
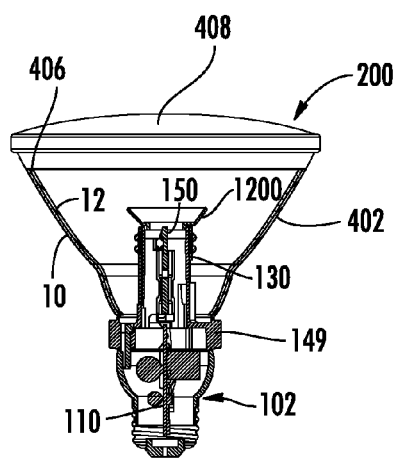
FIG. 25 is a section view taken along line 25-25 of FIG. 24.
Figure 26:
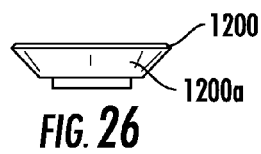
FIG. 26 is a side view of an embodiment of a reflector.
Figure 28:
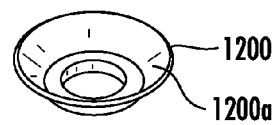
FIG. 28 is a perspective view of the reflector of FIG. 26.
Figure 27:
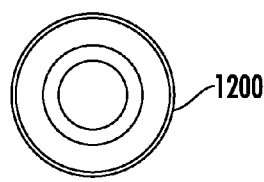
FIG. 27 is a top view of the reflector of FIG. 26.
Figure 29:
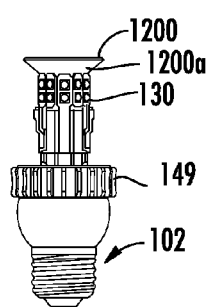
FIG. 29 is a side view of the assembly of FIG. 26.
Figure 30:
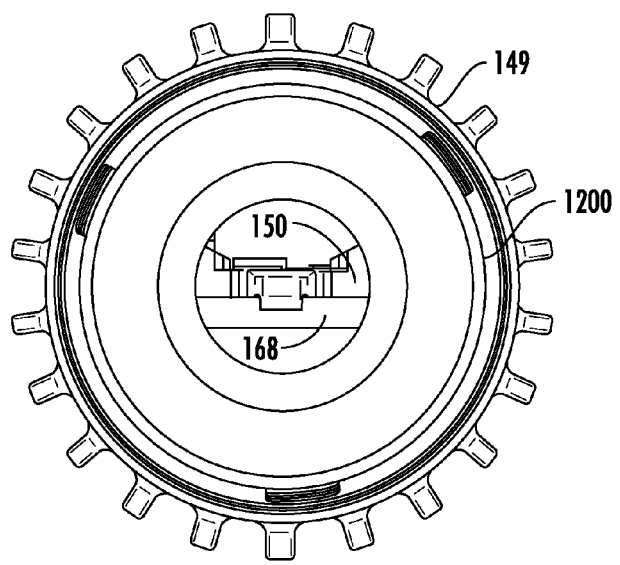
FIG. 30 is a top view showing the reflector and LED assembly and heat sink of the embodiment of FIG. 26.
Figure 31:
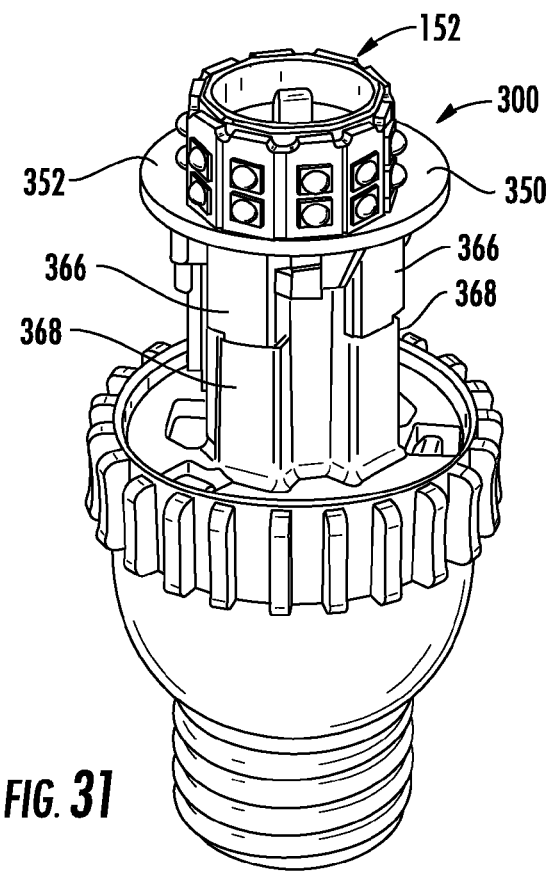
FIG. 31 is a perspective view of an embodiment of a reflector, heat sink and base.
Figure 32:
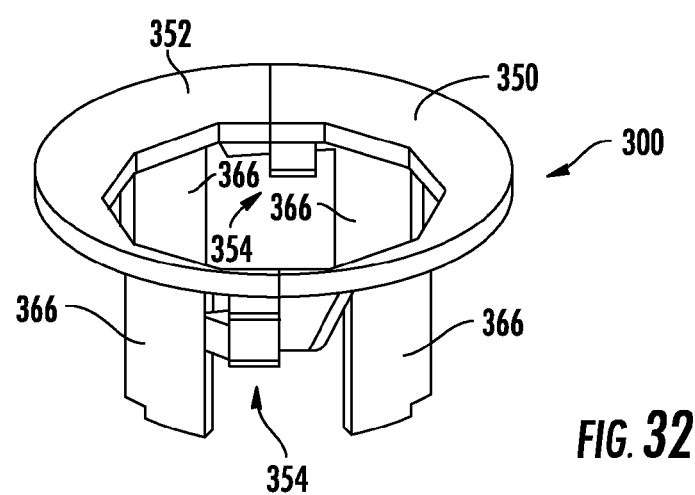
FIG. 32 is a perspective view of one embodiment of the reflector of FIG. 31.
Figure 33:
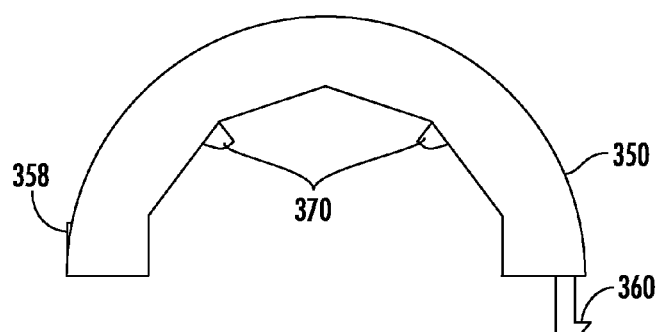
FIG. 33 is a top view of one portion of the reflector of FIG. 31.
Figure 34:
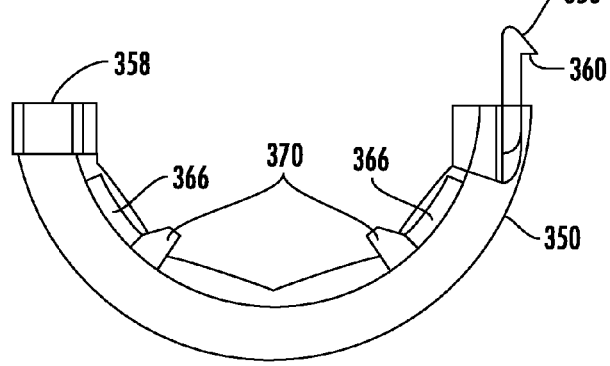
FIG. 34 is a bottom view of one portion of the reflector of FIG. 31.

The $TiO_2$ loaded coating may correspond substantially to the first layer 10 or it may cover more or less of the interior surface of enclosure 302 than the first layer 10. In some embodiments, the enclosure is made of an optically transmissive material as previously described and the portion of the enclosure that is closer to the base is covered by the first reflective layer 10 leaving the remaining portion of the enclosure optically transmissive. The second reflective layer 12 may be coincident with the first opaque/reflective layer 10 as shown in FIG. 3. The remaining portion of the enclosure that is not covered by the first layer 10 and the second reflective layer 12 may be optically transmissive and may define the exit surface or surfaces of the lamp. In some embodiments, the second reflective layer 12 may cover the first layer 10 and extend beyond the first layer 10 onto a portion of the optically transmissive material of the enclosure 302, 402 as shown in FIG. 17. The remaining portion of the enclosure that is not covered by the first layer 10 and/or the second reflective layer 12 may be optically transmissive and may define the exit surface of the lamp.

In some embodiments, the second reflective layer 12 comprises approximately 20-40% $TiO_2$ by weight of the silicone/$TiO_2$ mixture. In one embodiment, a second reflective layer 12 comprising approximately 30% $TiO_2$ by weight of the silicone/$TiO_2$ mixture has shown to eliminate the adverse impact and/or variations of the underlying metal reflective layer 10. Lower or higher loadings of the reflective media may be used depending upon the thickness of the second layer 12. A higher or lower amount of $TiO_2$ may be used depending upon the desired reflectivity of the enclosure, cost and/or manufacturability. The $TiO_2$ additive may use different particle sizes. In one embodiment the mean particle size is about 200 nm. In other embodiments, the mean particle size may be less than 1 micron, less than 500 nm, less than 300 nm, less than 100 nm or from about 50 nm-1 micron, 100 nm-500 nm, 100 nm-300 nm. The particles may have inorganic coatings like $Al_2O_3$ or $SiO_2$ and/or organic coatings.

Figure 38B:
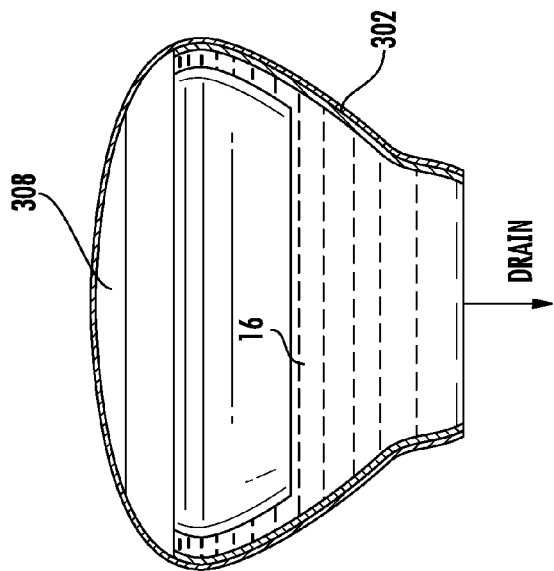
FIGS. 38a-38d illustrate an embodiment of making a lamp enclosure of the invention.
Figure 38A:
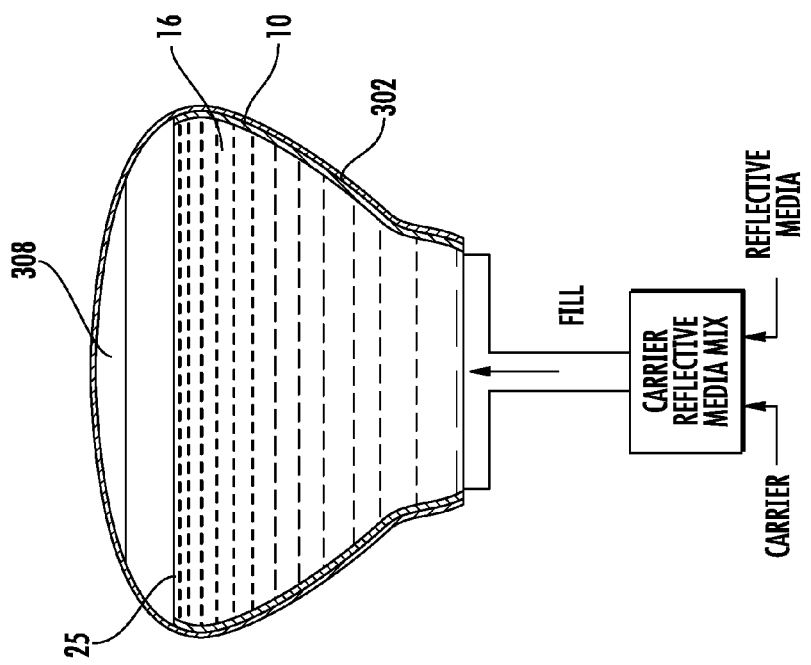
Figure 38D:
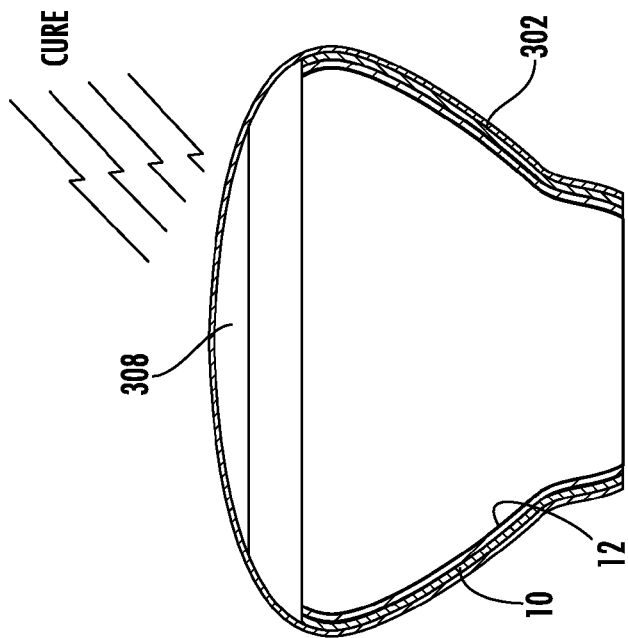
Figure 38C:
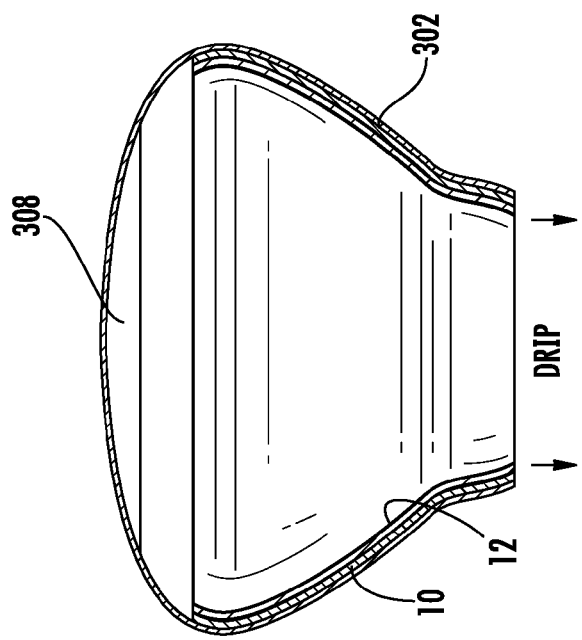

In one method of making the reflective surface of the invention on the inside surface of the enclosure, an enclosure 302 having the first layer 10 of reflective metal such as an aluminized coating or an opaque light-blocking material is filled with the carrier/reflective media mixture 16, FIG. 38a. The enclosure 302 may be filled with the enclosure facing up such that the carrier/reflective media mixture 16 is filled to a desired level 25 such that the reflective surface partially fills the enclosure. Typically, the reflective layer extends to a level below the exit surface 308 of the enclosure 304 such that the reflective layer does not adversely impact transmission of light from the lamp. The carrier/reflective media mixture 16 is drained from the enclosure FIG. 38b and allowed to drip to achieve a desired coating thickness, FIG. 38c. In order to achieve the proper coating the material mixture must have a viscosity that allows it to drain and drip properly so that the remaining film is neither too thick nor too thin. In one embodiment a mixture having a 30% loading of $TiO_2$ with a viscosity of about 10000 cP provided an adequate flow and drip out. However, the specific viscosity may depend on the starting viscosity of the carrier and the loading percent. The enclosure with the coating may then be cured in a high temperature (150° C.) oven, FIG. 38d. The second layer 12 may also be applied using spin coating, spray coating and/or other application methods.

The second layer 12 may comprise any suitable coating material in place of the silicone that may suitably adhere to the aluminum coated glass enclosure and that can act as a transparent carrier for the reflective media. The reflective media may comprise $TiO_2$, Barium Sulfate, ZnO or other materials with highly reflective properties. In some embodiments, the reflective layer may comprise a mixture of different reflective media. In some embodiments, the reflective media or material has an index of refraction greater than 2 and the index of refraction may be between approximately 2.5 and 2.7.

In addition to the coating processes discussed above the second layer 12 may be applied using other methodologies. In one embodiment, the second layer 12 may comprise silver applied over the top of the aluminum first layer 10 in a vacuum metalizing process. The second layer 12 may comprise silver applied over the top of a first aluminum layer 10 using a sputtering process. The second layer 12 may comprise silver plated on the first aluminum layer 10. The second layer 12 may comprise a highly reflective, thin film anodic coating applied as the reflector surface. The second layer 12 may comprise a highly reflective white polyester paint powder coated on the first layer 10, using the aluminum layer 10 as the conductor to attract the paint.

In some embodiments, the second layer of a highly reflective coating 12 may be applied directly to the enclosure 302 without using the first layer 10. In the two layer embodiments described above, the first layer 10 is used to eliminate light leakage through the enclosure 302 and, in some embodiments, is used as the electrically conductive foundation on which to build the second layer 12. However, the first layer 10 may be eliminated if the second reflective layer 12 provides the desired uniformity of performance and/or improved reflectivity and efficacy. In such applications, the second reflective layer 12 may be applied directly to the surface of the enclosure 302 and constitute a single layer reflector surface.

Figure 40:
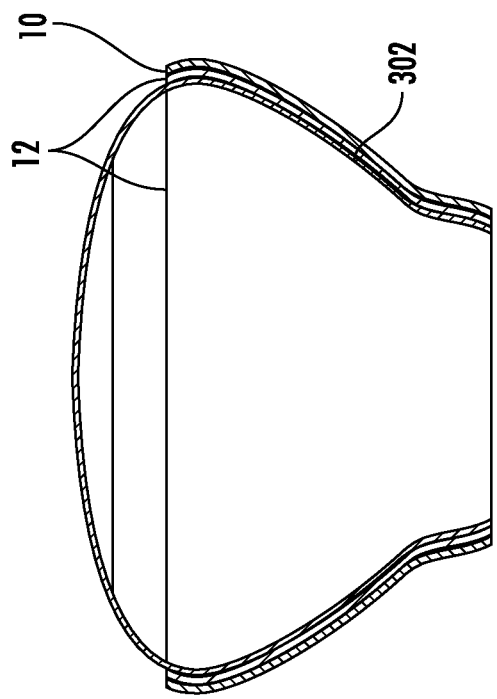
FIG. 40 is a section view of another alternate embodiment of an enclosure for a lamp.
Figure 39:
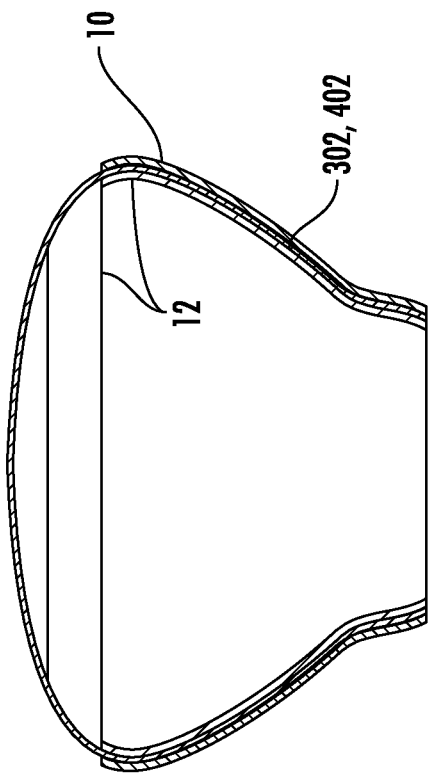
FIG. 39 is a section view of an alternate embodiment of an enclosure for a lamp.

Referring to FIG. 39, an alternate embodiment of the enclosure is shown where the second reflective layer 12 is applied to the interior surface of the enclosure 302, 402 and the first light blocking layer 10 is applied to the exterior surface of the enclosure. FIG. 40 shows another embodiment of the enclosure where the second reflective surface 12 is applied to the enclosure on the exterior surface of the enclosure and the first light blocking layer 10 is applied over the reflective surface 12 on the outside of the reflective surface 12. The first layer 10 in any of the embodiments described herein may be a light blocking material that is opaque or a light blocking material that is reflective or a light blocking material that is a diffuse reflector.

FIGS. 9-15 show an embodiment of a PAR type lamp that uses the LED assembly 130, heat sink with the tower arrangement 149 and electrical interconnect 150 as previously described. In a PAR type lamp the light is emitted in a directional pattern. Standard PAR bulbs are reflector bulbs that reflect light in a direction where the beam angle is tightly controlled using a parabolic reflector. PAR lamps may direct the light in a pattern having a tightly controlled beam angle such as, but not limited to, 10°, 25° and 40°. The bulb shown in FIG. 9 may be used as a solid state replacement for such a reflector type PAR bulb.

To create a directional light pattern, a primary reflector 400 is provided that reflects light generated by the LED assembly 130 generally in a direction along the axis of the lamp. Because the lamp is intended to be used as a replacement for a PAR type lamp, the reflector 400 may reflect the light in a tightly controlled beam angle. The reflector 400 may comprise a parabolic reflective surface 400a such that light reflecting off of the reflector 400 is reflected generally along the axis of the lamp to create a beam with a controlled beam angle.

The reflector 400 is preferably made of a specular material. The specular reflectors may be injection molded plastic or die cast metal (aluminum, zinc, magnesium) with a specular coating. The specular material could also be a formed film, such as 3M's Vikuiti ESR (Enhanced Specular Reflector) film. It could also be formed aluminum, or a flower petal arrangement in aluminum using Alanod's Miro or Miro Silver sheet. In some embodiments, the reflector may be a diffuse or Lambertian reflector and may be made of a white highly reflective material such as injection molded plastic, white optics, PET, MCPET, or other reflective materials. The reflector may reflect light but also allow some light to pass through it. The reflector 400 is mounted in the lamp such that it surrounds the LED assembly 130 and reflects some of the light generated by the LED assembly.

Because the lamp is used as a PAR replacement, the beam angle is tightly controlled where the light that is reflected from the reflector 400 is emitted from the lamp at a tightly controlled the beam angle. The reflector 400 is mounted such that the light emitted from the LED assembly 130 is emitted at or near the focus of the parabolic reflector 400. Other arrangements of the LEDs may be made provided that the reflector reflects the light at the desired beam angle.

The reflector 400 is dimensioned such that the LED assembly 130, heat sink 149 and reflector 400 may be inserted through the opening 404 in the neck of a PAR type enclosure 402 as previously described. At least a portion of the light generated by the LED assembly 130 may not be reflected by the reflector 400. At least some of this light may be reflected by the parabolic reflective surface 406 of the enclosure 402. Some of the light generated by the LED assembly 130 may be projected out of the exit surface 408 without being reflected by the reflector 400 or the reflective surface 406. The reflective surface 406 in the lamp of FIGS. 9-15 may comprise the first layer 10 and second layer 12 as previously described with respect to the embodiment of FIGS. 1-3.

One potential issue with using a single, large parabolic reflector 400 that surrounds the entire LED assembly 130, as described above, is that some of the light may be reflected in a generally horizontal plane such that it circles the reflector 400 and reflects multiple times from the reflector 400 before being emitted from the lamp. Such a situation results in a loss of efficiency. To lower these losses, a parabolic reflector 500 may be provided for each LED 127 such that each LED 127 has associated with it a relatively small parabolic reflector 500 that reflects light from that LED as shown in FIGS. 16-23. The reflectors 500 and LEDs 127 may be in a one-to-one relationship or a single reflector may be used with more than one LED, but with fewer than all of the LEDs of LED array 130. The reflectors 500 may be specular. Moreover, the LED assembly may be modified to allow the mounting of the reflectors with the associated LEDs. For example, the LEDs may need to be more widely spaced to accommodate the reflectors or the LED assembly may need to be made smaller.

As previously explained, the reflectors 500 as described herein may be positioned such that the reflector 500 reflects a portion of the light generated by the LED assembly 130. However, at least a portion of the light generated by the LED assembly 130 may not be reflected by the reflector 500. At least some of this light may be reflected by the reflective surface 406 of the enclosure 402. Some of the light generated by the LED assembly may be projected to the lens portion without being reflected by the reflector or the enclosure. The reflective surface 406 in the lamp of FIGS. 16-23 may comprise the first layer 10 and second layer 12 as previously described with respect to the embodiment of FIGS. 1-3.

As was explained with respect to the previously described embodiments of a directional lamp, at least some of the light generated by the LED assembly 130 may be directed toward the exit surface of the lamp. An LED 127 positioned as described herein may have a beam angle of approximately 120° such that at least some of the light emitted from the LEDs 127 is directed directly out the exit surface. In order to capture this light and shape the beam, a reverse or downward facing reflector 1200 may be added as shown in FIGS. 24-30. The reverse reflector 1200 captures light that is projected toward the exit surface of the lamp and reflects that light from reflecting surface 1200a to the primary reflector such that the light may be projected in the desired beam angle by the primary reflector as described above. Any suitable reflector may be used as the reverse reflector to redirect the light toward the primary reflector. Some of the light generated by the LED assembly may be projected to the lens portion without being reflected by the reflector or the enclosure. The reflective surface 406 in the lamp of FIGS. 24-30 may comprise the first layer 10 and second layer 12 as previously described with respect to the embodiment of FIGS. 1-3.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A lamp comprising:
   an enclosure having a surface, a reflective surface formed on the surface and an exit surface through which light is emitted from the enclosure;
   at least one LED located in the enclosure and operable to emit light when energized;
   wherein the reflective surface comprises a first layer and a second reflective layer covering the first layer wherein the second reflective layer comprises a transparent carrier mixed with a reflective media.

2. The lamp of claim 1 wherein the first layer comprises a reflective surface.

3. The lamp of claim 1 wherein the first layer comprises a metalized surface.

4. The lamp of claim 3 wherein the metalized surface comprises aluminum.

5. The lamp of claim 1 wherein the reflective media has an index of refraction greater than 2.

6. The lamp of claim 1 wherein the second reflective layer comprises a dielectric material.

7. The lamp of claim 1 wherein the second reflective layer comprises a diffuse reflector.

8. The lamp of claim 1 further comprising a base through which an electrical path is formed to energize the at least one LED.

9. The lamp of claim 8 wherein the enclosure is made of an optically transmissive material and a portion of the enclosure that is closer to the base is covered by the first layer.

10. The lamp of claim 9 wherein the second reflective layer covers the first layer and extends beyond the first layer onto the optically transmissive material.

11. The lamp of claim 9 wherein the second reflective layer is coincident with the first layer.

12. The lamp of claim 1 wherein the transparent carrier comprises a transparent silicone.

13. The lamp of claim 1 wherein the second reflective layer comprises $TiO_2$.

14. The lamp of claim 1 wherein the second reflective layer is located on an inside surface of the enclosure and first layer is disposed on an exterior surface of the enclosure substantially coextensive with the second reflective layer.

15. The lamp of claim 1 wherein the first layer comprises a reflective material and is located on an inside surface of the enclosure and the second reflective layer is disposed over the first layer.

16. The lamp of claim 1 wherein the second reflective layer comprises a transparent silicone mixed with $TiO_2$.

17. The lamp of claim 16 wherein the second reflective layer comprises approximately 20% $TiO_2$ by weight.

18. The lamp of claim 1 wherein the second reflective layer comprises particles of $TiO_2$.

19. The lamp of claim 18 wherein the size of the particles is in a range of approximately 50 nm to approximately 1 micron.

20. The lamp of claim 18 wherein the size of the particles is approximately 200 nm.

21. The lamp of claim 1 wherein the second reflective layer corresponds substantially to the first layer.

22. The lamp of claim 1 wherein the second reflective layer comprises silver.

23. The lamp of claim 1 wherein the second reflective layer comprises a highly reflective, thin film anodic coating.

24. The lamp of claim 1 wherein the second reflective layer comprises a highly reflective white polyester paint powder coat.

25. The lamp of claim 1 wherein the first layer comprises an opaque surface.

26. The lamp of claim 1 wherein the first layer is located on an inside surface of the enclosure and the second reflective layer is disposed over the first layer.

27. The lamp of claim 1 wherein the second reflective layer is located on an exterior surface of the enclosure and the first layer is located over the second reflective layer.

28. A method of making an enclosure for a lamp comprising:
providing an enclosure having a first layer of reflective metal;
partially filling the enclosure with a mixture of clear silicone and a reflective media;
draining the mixture from the enclosure;
curing the mixture using heat.

29. A lamp comprising:
an enclosure having a reflective surface and an exit surface through which light is emitted from the enclosure;
a base;
at least one LED located in the enclosure and operable to emit light when energized through an electrical path from the base;
wherein the reflective surface comprises an exposed reflective layer comprising a mixture of transparent silicone and $TiO_2$.

30. A lamp comprising:
an enclosure having a surface, a reflective surface formed on the surface and an exit surface through which light is emitted from the enclosure;
at least one LED located in the enclosure and operable to emit light when energized;
wherein the reflective surface consists of a first layer and a second reflective layer covering the first layer.

31. A lamp comprising:
an enclosure having a surface, a reflective surface formed on the surface and an exit surface through which light is emitted from the enclosure;
at least one LED located in the enclosure and operable to emit light when energized;
wherein the reflective surface comprises a first layer and a second reflective layer covering the first layer wherein the second reflective layer comprises one of Barium Sulfate and ZnO.

* * * * *